(12) United States Patent
Tashiro

(10) Patent No.: US 12,109,659 B2
(45) Date of Patent: Oct. 8, 2024

(54) MAGNET SEPARATOR

(71) Applicant: BUNRI Incorporation, Tokyo (JP)

(72) Inventor: Makoto Tashiro, Tokyo (JP)

(73) Assignee: BUNRI INCORPORATION, Tokyo (JP)

( * ) Notice: Subject to any disclaimer, the term of this patent is extended or adjusted under 35 U.S.C. 154(b) by 0 days.

(21) Appl. No.: 18/344,741

(22) Filed: Jun. 29, 2023

(65) Prior Publication Data
US 2023/0339058 A1 Oct. 26, 2023

Related U.S. Application Data

(63) Continuation of application No. PCT/JP2022/030125, filed on Aug. 5, 2022.

(30) Foreign Application Priority Data

Sep. 22, 2021 (JP) ................. 2021-154084

(51) Int. Cl.
*B23Q 11/00* (2006.01)
*B03C 1/12* (2006.01)

(52) U.S. Cl.
CPC ............ *B23Q 11/0064* (2013.01); *B03C 1/12* (2013.01)

(58) Field of Classification Search
CPC ... B23Q 11/0064; B23Q 11/1069; B03C 1/12; B03C 2201/18; B03C 1/14; B03C 1/145; B03C 1/025; B24B 55/12; Y02P 70/10
See application file for complete search history.

(56) References Cited

U.S. PATENT DOCUMENTS

| 11,919,128 B2 * | 3/2024 | Fukui | B24B 9/06 |
| 2020/0171510 A1 * | 6/2020 | Iwao | B03C 1/12 |
| 2021/0078014 A1 * | 3/2021 | Nishizawa | B03C 1/288 |

FOREIGN PATENT DOCUMENTS

| CN | 105583073 A | 5/2016 |
| CN | 208303013 U | 1/2019 |
| CN | 211514856 U | 9/2020 |
| JP | S42-12339 B1 | 7/1967 |
| JP | S60-128742 U | 8/1985 |

(Continued)

OTHER PUBLICATIONS

Savox USA, SW2290SG-BE—Waterproof Monster Torque High Voltage, Brushless, Digital Servo, Jan. 20, 2021, https://web.archive.org/web/20210120173302/https://www.savoxusa.com/collections/high-torque/products/new-monster-performance-high-voltage-high-torque-standard-size-servo#technical-details (Year: 2021).*

(Continued)

*Primary Examiner* — Jacob S. Scott
*Assistant Examiner* — Miraj T. Patel
(74) *Attorney, Agent, or Firm* — John P. White

(57) ABSTRACT

A magnet separator includes a separator body, a magnet drum and a driving portion. The magnet drum includes a first shaft, a cylinder provided inside the separator body, rotatably supported in the first shaft, an inner cylinder secured to the first shaft inside the cylinder, a magnet provided in the inner cylinder, and a second shaft rotating together with the cylinder. The separator body includes a pair of side walls. The driving portion includes an output portion provided on the outside the separator body. The second shaft penetrates one of the side walls toward outside of the separator body. The output portion is connected to the second shaft.

9 Claims, 16 Drawing Sheets

(56) References Cited

FOREIGN PATENT DOCUMENTS

| | | |
|---|---|---|
| JP | 3010688 U | 2/1995 |
| JP | 2003-117314 A | 4/2003 |
| JP | 2005-131479 A | 5/2005 |
| JP | 2014-28409 A | 2/2014 |
| JP | 5734237 B2 | 6/2015 |
| WO | WO 2009/099188 A1 | 8/2009 |

OTHER PUBLICATIONS

Office Action issued Apr. 27, 2023 in connection with Taiwanese Application No. TW 111133359, including English Language translation.
International Search Report/Written Opinion, Sep. 27, 2022 for PCT/2022/930125.

* cited by examiner

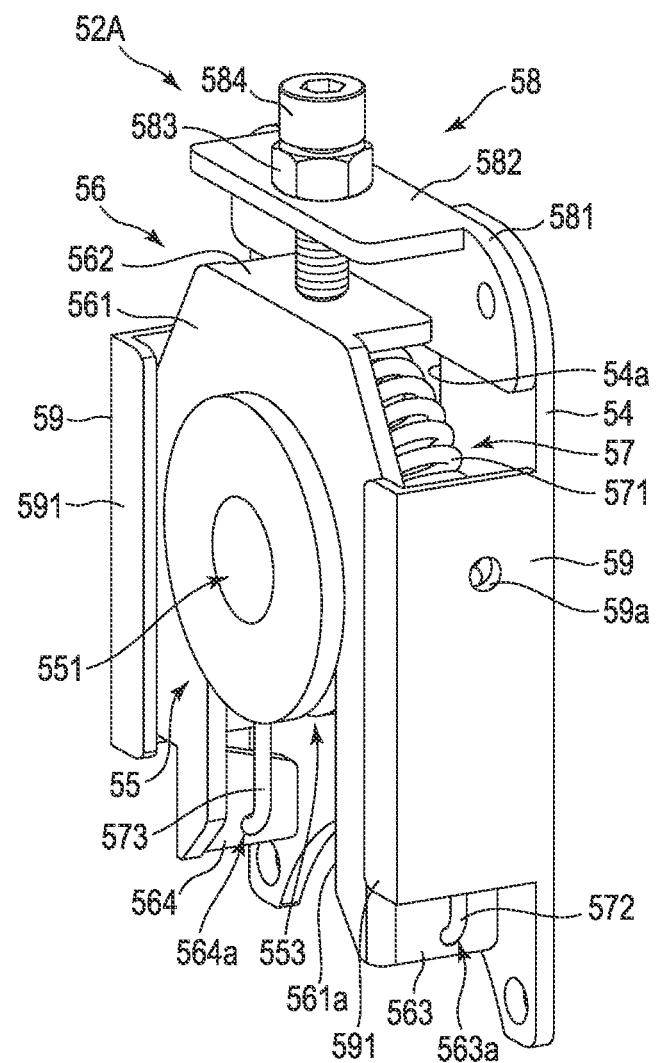
F I G. 20

MAGNET SEPARATOR

CROSS-REFERENCE TO RELATED APPLICATIONS

This application is a Continuation Applications of PCT Application No. PCT/JP2022/030125, filed Aug. 5, 2022 and based upon and claiming the benefit of priority from prior Japanese Patent Application No. 2021-154084, filed Sep. 22, 2021, the entire contents of all of which are incorporated herein by reference.

BACKGROUND OF THE INVENTION

1. Field of the Invention

The present invention relates to a magnet separator.

2. Description of the Related Art

When metal materials and the like are ground and cut by machine tools, various types of fluids called a grinding fluid, a cutting fluid, a coolant, etc., are used to improve the processing accuracy, extend the life of the used tools and prompt the discharge of chips, metal powder, etc. These fluids are discharged from the machine tools in a state where foreign substances such as chips and metal powder generated by machining are contained. After use, the fluids contain foreign substances such as a magnetic material. The foreign substances may form dirty mud called sludge in the fluids.

The fluids discharged from the machine tools are returned to the machine tools and reused after the foreign substances such as chips are separated and removed. Thus, various types of devices which collect the fluid discharged from a machine tool and separate and remove foreign substances from the fluid are known. For example, as a device which separates and removes a foreign substance containing a magnetic material from a fluid, a magnet separator is known (for example, JP 5734237 B).

A magnet separator comprises, for example, a filtration tank which stores a fluid, a drum which comprises a cylindrical outer circumferential surface horizontally and rotatably supported in the filtration tank, a permanent magnet which is provided in the drum such that a magnetic force is generated on the cylindrical surface of the drum, a scraper plate which is secured to the filtration tank so as to scrape the magnetic powder absorbed to the cylindrical surface of the drum, a partial cylindrical plate which is secured to the downstream side of a flashboard partitioning the filtration tank and faces the lower side of the cylindrical outer circumferential surface of the drum at a predetermined interval, and a drum driving device comprising a driving and rotating body which transmits power to a driven and rotated body secured to an end portion of the cylindrical drum inside the filtration tank.

The driving and rotating body and the driven and rotated body are provided inside the filtration tank together with the drum, etc. The driving and rotating body and the driven and rotated body may be worn by the effect of the foreign substances contained in the fluid stored in the filtration tank. In this regard, JP 5734237 B suggests the structure of the magnet separator for preventing the wear of the driving and rotating body, etc.

Even if the magnet separator disclosed in the above JP 5734237 B is considered, the structure for preventing the wear of the driving and rotating body, etc., has a room for improvement in terms of various aspects. For example, even the magnet separator disclosed in JP 5734237 B cannot sufficiently prevent the attachment of a fluid to the driving and rotating body, etc.

BRIEF SUMMARY OF THE INVENTION

Thus, one of the objects of the present invention is to provide a magnet separator which is not easily affected by a foreign substance contained in a fluid and has high durability.

According to an embodiment of the present invention, a magnet separator comprises a separator body comprising a storage portion which stores a fluid containing a magnetic material, a magnet drum provided in the separator body, and a driving portion provided outside the separator body. The magnet drum comprises a first shaft extending in a horizontal direction, a cylinder provided inside the separator body, rotatably supported in the first shaft so as to be at least partly immersed in the fluid and comprising an outer circumferential surface and an inner circumferential surface on an opposite side of the outer circumferential surface, an inner cylinder secured to the first shaft inside the cylinder, a magnet provided in the inner cylinder so as to face the inner circumferential surface and forming a magnetic field area to which the magnetic material can be attached in a certain range in a circumferential direction of the outer circumferential surface, and a second shaft provided on a same line as a central axis of the first shaft and rotating together with the cylinder. The separator body comprises a pair of side walls arranged in the horizontal direction. The driving portion comprises an output portion provided on the same line as the central axis of the first shaft outside the separator body. The second shaft penetrates one of the side walls toward outside of the separator body. The output portion is connected to the second shaft to rotate the cylinder.

According to another embodiment of the present invention, a magnet separator comprises a separator body comprising a storage portion which stores a fluid containing a magnetic material, a magnet drum provided in the separator body, a driving portion provided outside the separator body, a bottom plate which forms a channel to which the fluid is supplied from the storage portion, and a pair of partition plates. The magnet drum comprises a first shaft extending in a horizontal direction, a cylinder provided inside the separator body, rotatably supported in the first shaft so as to be at least partly immersed in the fluid and comprising an outer circumferential surface and an inner circumferential surface on an opposite side of the outer circumferential surface, a pair of side plates provided in both end portions of the cylinder and rotatably supported in the first shaft, a magnet provided so as to face the inner circumferential surface and forming a magnetic field area to which the magnetic material can be attached in a certain range in a circumferential direction of the outer circumferential surface, and a second shaft provided in one of the side plates on a same line as a central axis of the first shaft, extending toward outside of the separator body and rotating together with the cylinder. The driving portion is connected to the second shaft outside the separator body to rotate the cylinder. The bottom plate is provided inside the separator body across an intervening gap along the outer circumferential surface. Each of the partition plates is provided between the side plate and a side wall of the separator body and extends in the central axis.

The present invention can provide a magnet separator which is not easily affected by a foreign substance contained in a fluid and has high durability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 20 is a diagram showing a modified example of the squeeze roller adjustment mechanism provided in the magnet separator.

DETAILED DESCRIPTION OF THE INVENTION

Figure 1:
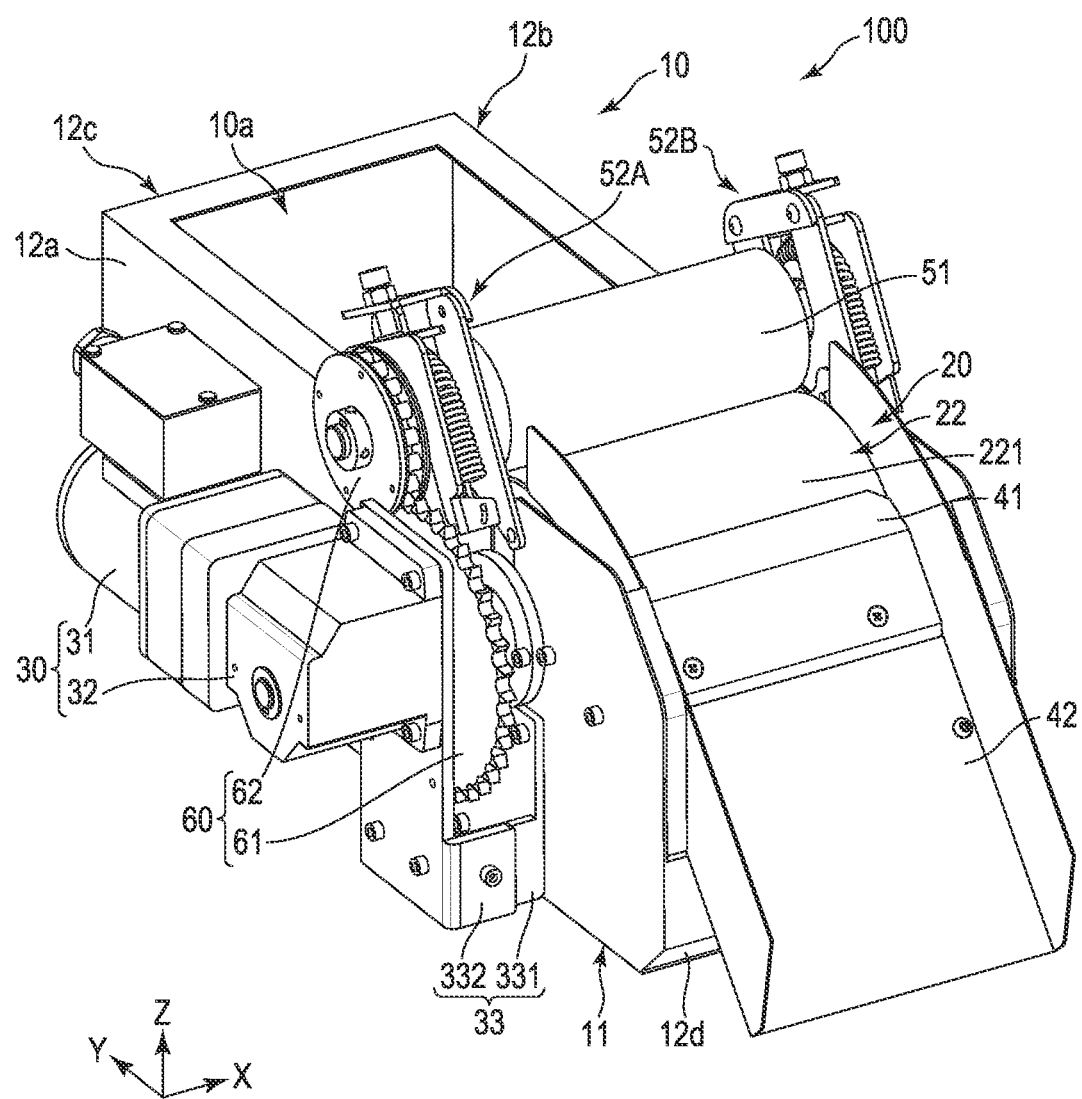
FIG. 1 is a schematic perspective view of a magnet separator according to a first embodiment.

Hereinafter, each embodiment of a magnet separator is explained with reference to the accompanying drawings.

The disclosure is merely an example, and the invention is not limited by contents described in the embodiments below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of figures are denoted by like reference numbers, detailed description thereof being omitted unless necessary.

In each embodiment, a first direction X, a second direction Y and a third direction Z are defined. The first direction X is an example of a horizontal direction. The first direction X, the second direction Y and the third direction Z are orthogonal to each other. However, they may intersect each other at an angle other than 90 degrees. One side of the third direction Z may be called "top" or "upper side". The other side of the third direction Z may be called "bottom" or "lower side".

First Embodiment

The present embodiment exemplarily shows a magnet separator which separates and removes mainly a magnetic material from the foreign substances contained in the fluid, such as a grinding fluid, discharged from a machine tool such as a grinder. The fluid includes a water-soluble fluid and an oil-based fluid. The magnetic material is, for example, metal powder or abrasive grains. The magnetic material has a property attracted by a magnetic force.

Figure 2:
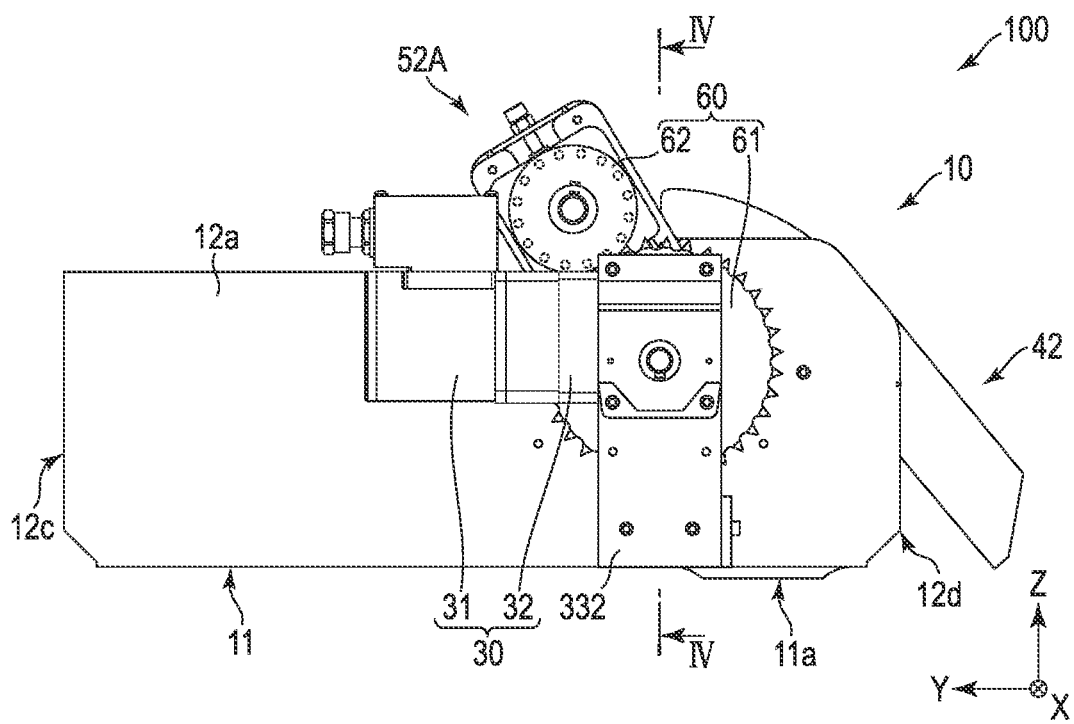
FIG. 2 is a schematic side view of the magnet separator according to the first embodiment.
Figure 3:
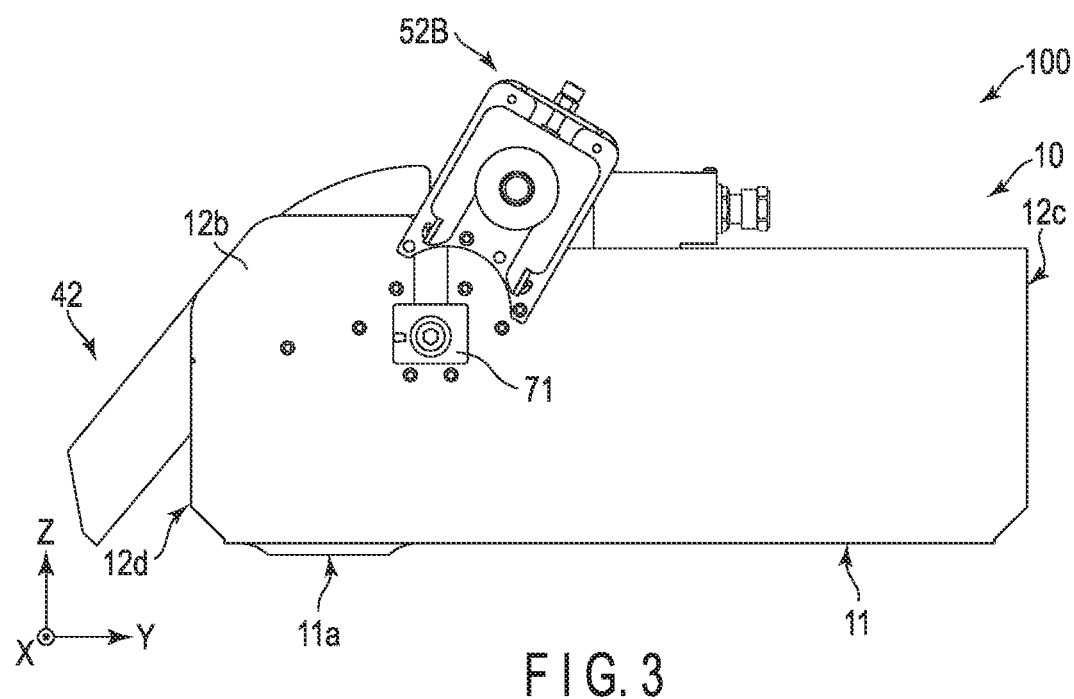
FIG. 3 is a schematic side view of the magnet separator according to the first embodiment.

FIG. 1 is a schematic perspective view of a magnet separator 100 according to a first embodiment. FIG. 2 is a schematic side view of the magnet separator 100 according to the first embodiment. FIG. 3 is a schematic side view of the magnet separator 100 according to the first embodiment. FIG. 2 is a side view in which the magnet separator 100 is viewed in the first direction X. FIG. 3 is a side view in which the magnet separator 100 is viewed in the opposite direction of the first direction X.

As shown in FIG. 1, the magnet separator 100 comprises a separator body 10 comprising a storage portion 10a which stores a fluid containing a foreign substance, a magnet drum 20 provided in the separator body 10, a driving portion 30 provided outside the separator body 10, a scraper 41, a squeeze roller 51, a pair of squeeze roller adjustment mechanisms 52A and 52B, and a transmission mechanism 60.

The separator body 10 has the shape of substantially a rectangular parallelepiped which is open to the upper side. In the example shown in FIG. 1, the length in the second direction Y is greater than that in the first direction X. From the opening, a fluid is put in the separator body 10. The separator body 10 comprises a rectangular bottom wall 11, side walls 12a and 12b connected to a pair of sides of the bottom wall 11, and side walls 12c and 12d connected to the other pair of sides of the bottom wall 11.

The side wall 12a and the side wall 12b are arranged in the first direction X and comprise surfaces parallel to the Y-Z plane defined by the second direction Y and the third direction Z. The side wall 12c and the side wall 12d are arranged in the Y direction and comprise surfaces parallel to the X-Z plane defined by the first direction X and the third direction Z. The outside of the separator body 10 includes, for example, a range other than the range surrounded by the bottom wall 11 and the side walls 12a to 12d.

The size of the separator body 10 may be appropriately changed based on the processing amount of the fluid by the magnet drum 20, etc. For example, the length of the separator body 10 in the first direction X is 150 mm to 1500 mm. For example, the length of the separator body 10 in the second direction Y is 300 mm to 1000 mm. For example, the length of the separator body 10 in the third direction Z is 150 mm to 500 mm.

For example, the end portions of the side walls 12c and 12d on the sides connected to the bottom wall 11 are bent. The length of the side wall 12c in the third direction Z is greater than that of the side wall 12d in the third direction Z. The separator body 10 is formed of, for example, a metal material such as stainless steel or iron. The separator body 10 is formed by, for example, bending a plate material.

As shown in FIG. 2 and FIG. 3, the bottom wall 11 comprises a fluid discharge port 11a which is open to the lower side. The fluid discharge port 11a is provided on the side wall 12d side in the second direction Y. For example, the magnet separator 100 discharges a fluid from which foreign substances are separated and removed from the fluid discharge port 11a.

The magnet drum 20 comprises a first shaft 21 extending in the first direction X (horizontal direction) as described later, and a cylinder 22 rotatably supported in the first shaft 21 inside the separator body 10 and including an outer circumferential surface 221. The driving portion 30 is provided on the side wall 12a side outside the separator body 10 by a bracket 33. The driving portion 30 comprises a motor 31 and a speed reducer 32 connected to the motor 31. The speed reducer 32 comprises a hollow output portion 321 as described later.

The driving portion 30 is connected to the side wall 12a via the bracket 33. The bracket 33 comprises a first bracket 331 connected to the side wall 12a and a second bracket 332 connected to the speed reducer 32. The first bracket 331 is connected to the second bracket 332 by a screw, etc. The bracket 33 is formed of, for example, a metal material such as stainless steel or iron.

The scraper 41 is provided on the side wall 12d side relative to the cylinder 22 in the second direction Y. The scraper 41 is connected to a foreign substance discharge port 42 provided on the upper side of the side wall 12d by a screw, etc. An end of the scraper 41 is bent so as to face the outer circumferential surface 221 of the cylinder 22. The foreign substance discharge port 42 inclines to the lower side with increasing distance from the magnet drum 20 in the opposite direction of the second direction Y.

The scraper 41 scrapes the foreign substances attached to the outer circumferential surface 221 of the cylinder 22 and containing a magnetic material from the outer circumferential surface 221. The foreign substances scraped by the scraper 41 are discharged from the foreign substance discharge port 42 to the outside of the separator body 10. The scraper 41 is formed of, for example, a metal material such as stainless steel or iron, or a resinous material such as polyurethane or ultrahigh molecular weight polyethylene. The shape of the scraper 41 may be another shape like a flat plate which is not bent, etc.

The squeeze roller 51 is provided on the upper side of the separator 10. The squeeze roller 51 is supported in the side walls 12a and 12b of the separator body 10 via a pair of roller adjustment mechanisms 52A and 52B provided on the both sides of the squeeze roller 51.

The transmission mechanism 60 is provided between the side wall 12a and the driving portion 30 on the side wall 12a side outside the separator body 10. The transmission mechanism 60 comprises a first rotating body 61 and a second rotating body 62 located on the upper side of the first rotating body 61 and engaging with the first rotating body 61. As shown in FIG. 3, the magnet separator 100 comprises a magnet adjustment tool 71 on the side wall 12b side outside the separator body 10.

Figure 4:
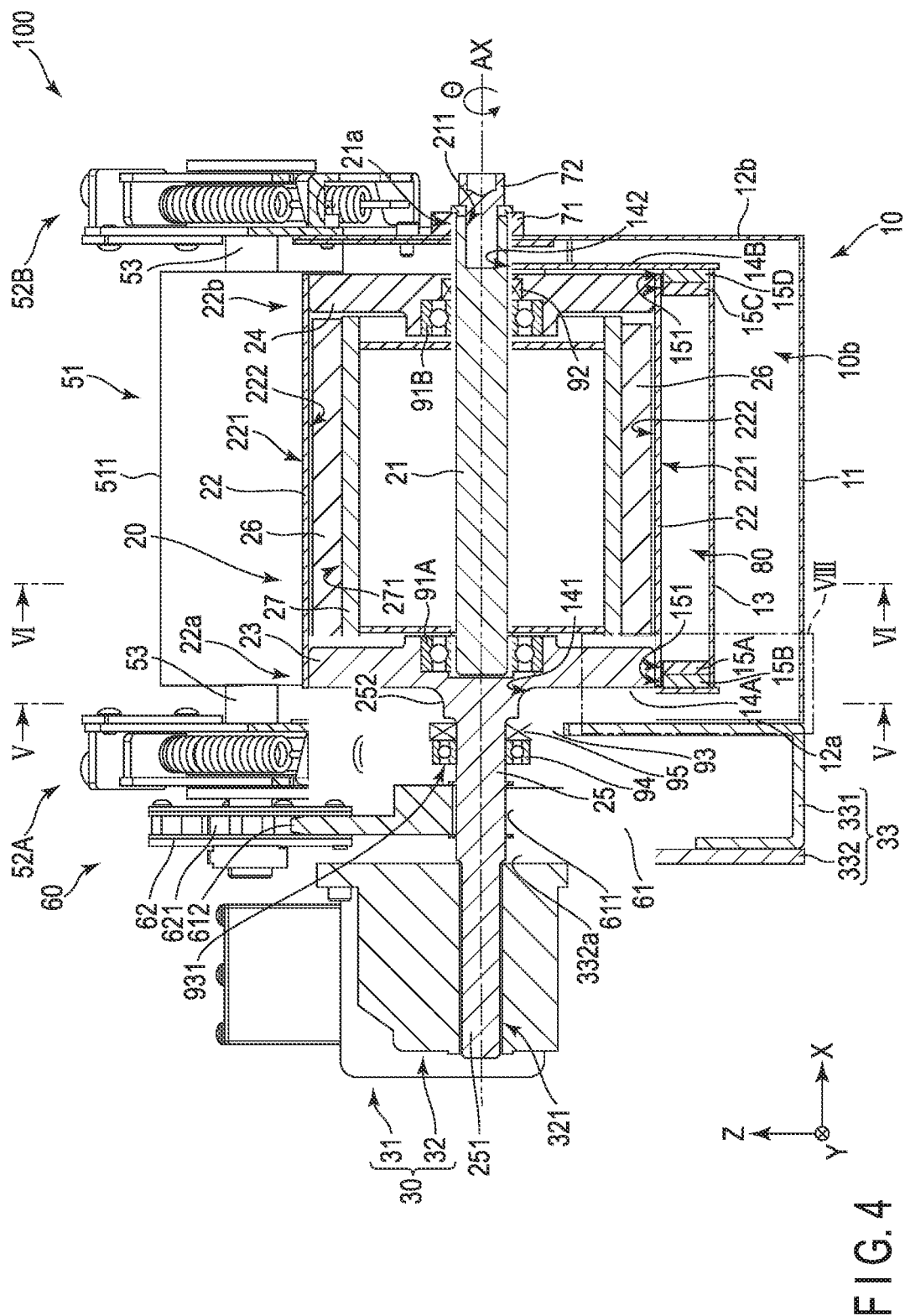
FIG. 4 is a schematic cross-sectional view of the magnet separator along the IV-IV line of FIG. 2.
Figure 5:
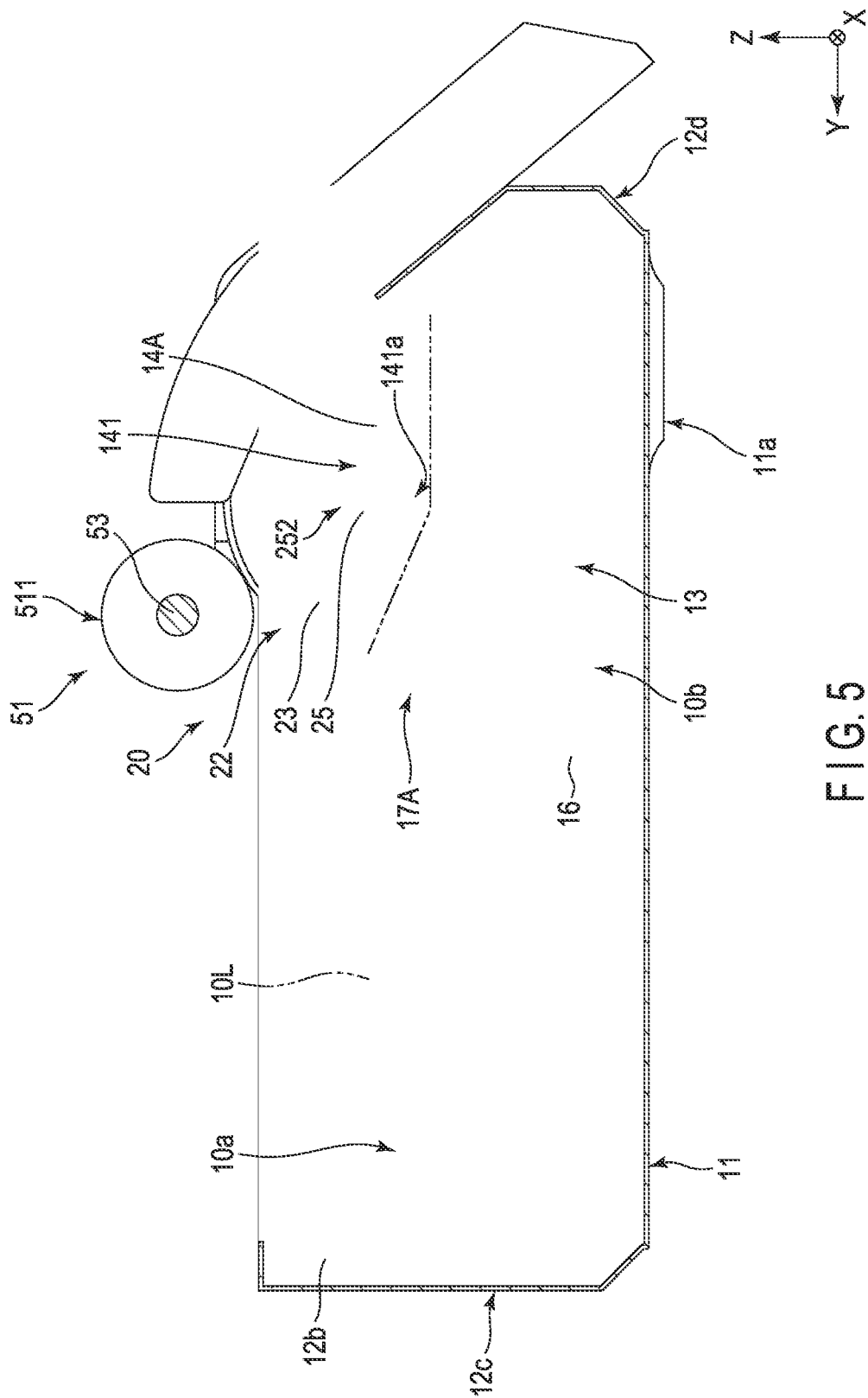
FIG. 5 is a schematic cross-sectional view of the magnet separator along the V-V line of FIG. 4.
Figure 6:
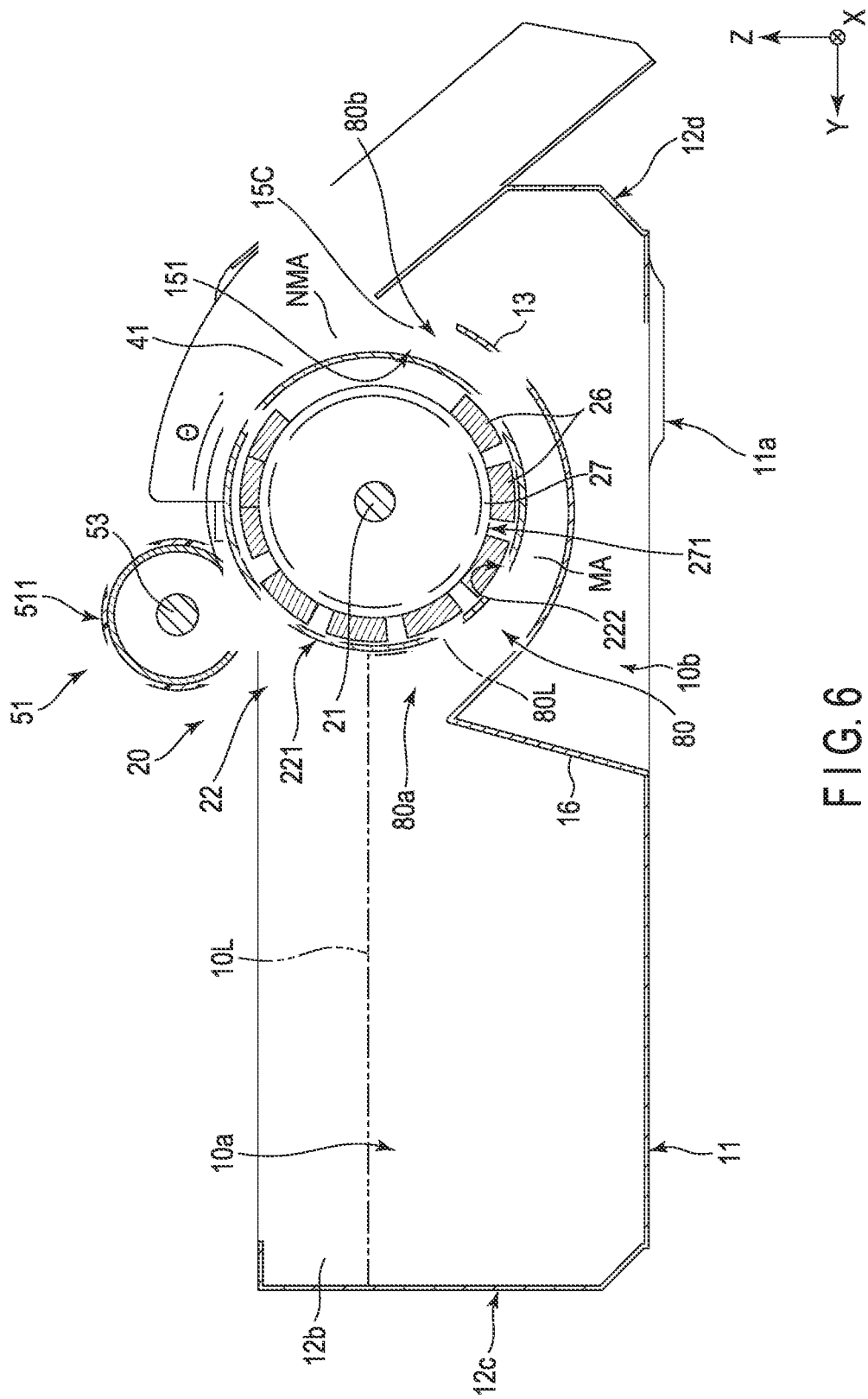
FIG. 6 is a schematic cross-sectional view of the magnet separator along the VI-VI line of FIG. 4.
Figure 7:
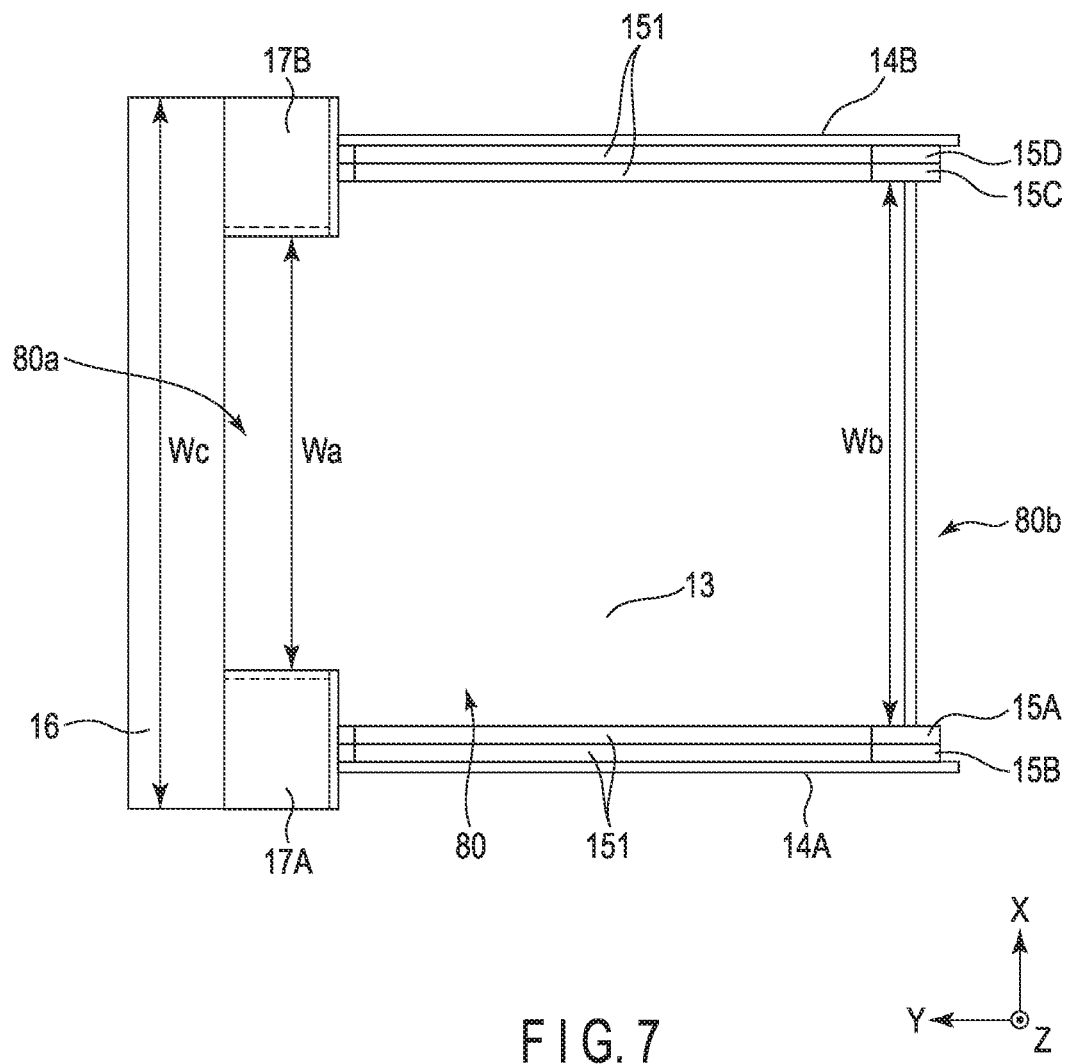
FIG. 7 is a schematic plan view of a channel formed in a separator body.
Figure 8:
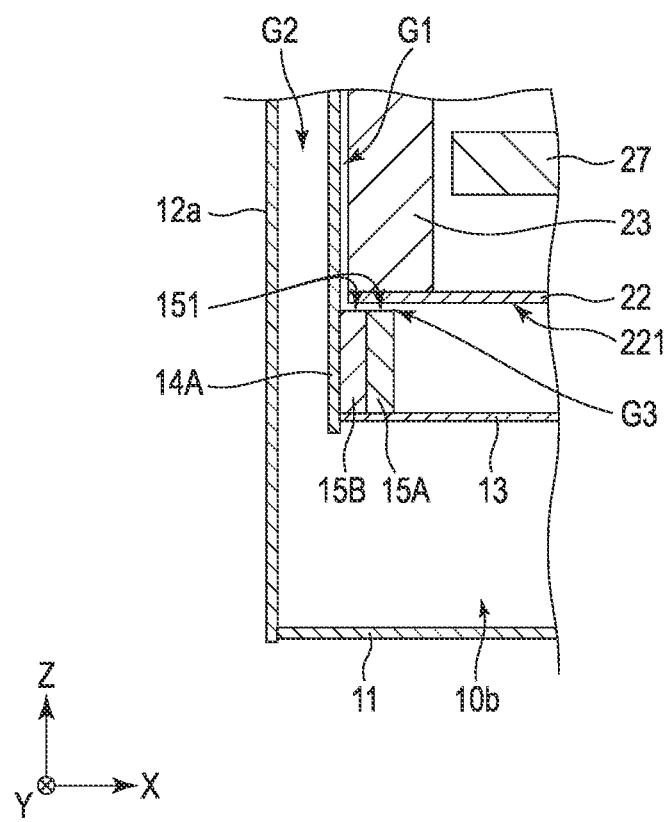
FIG. 8 is a schematic partial enlarged view showing the VIII portion of FIG. 4.

FIG. 4 is a schematic cross-sectional view of the magnet separator 100 along the IV-IV line of FIG. 2. FIG. 5 is a schematic cross-sectional view of the magnet separator 100 along the V-V line of FIG. 4. FIG. 6 is a schematic cross-sectional view of the magnet separator 100 along the VI-VI line of FIG. 4. FIG. 7 is a schematic plan view of a channel 80 formed in the separator body 10. FIG. 8 is a schematic partial enlarged view showing the VIII portion of FIG. 4.

FIG. 4 is a cross-sectional view in which the magnet separator 100 is viewed in the second direction Y. FIG. 5 and FIG. 6 are cross-sectional views in which the magnet separator 100 is viewed in the first direction X. In FIG. 7, some elements such as the separator body 10 and the magnet drum 20 are omitted.

The magnet drum 20 comprises the first shaft 21 extending in the first direction X, the cylinder 22 extending in the first direction X, and a pair of discoid side plates 23 and 24 rotatably supported in the first shaft 21. Each of the components constituting the magnet drum 20 is formed of, for example, a nonmagnetic material such as stainless steel excluding a magnet 26. The components may include a component formed of a metal material such as stainless steel or iron, and a resinous molded component.

In the example shown in FIG. 4, regarding the first shaft 21, an end portion 21a comprising a screw portion 211 penetrates the side wall 12b. In the side wall 12b, for example, a cutout through which the first shaft 21 passes and which is open toward the upper side is provided. The magnet adjustment tool 71 is attached to the end portion 21a in the opposite direction of the first direction X outside the separator body 10.

The first shaft 21 is supported in the side wall 12b together with the magnet adjustment tool 71 by a securing member 72 screwed into the screw portion 211. In another respect, the first shaft 21 is supported in the separator body 10 in a cantilever manner. The securing member 72 is, for example, a hexagon socket head bolt. However, the securing member 72 may be another type of bolt, etc.

The cylinder 22 comprises the outer circumferential surface 221, an inner circumferential surface 222 on the opposite side of the outer circumferential surface 221, an end portion 22a on the side wall 12a side of the cylinder 22, and an end portion 22b on the side wall 12b side of the cylinder 22. Inside the cylinder 22, the side plate 23 is provided in the end portion 22a, and the side plate 24 is provided in the end portion 22b.

Inside the side plates 23 and 24, bearings 91A and 91B are provided and rotatably supported in the first shaft 21. In the example shown in FIG. 4, inside the side plate 24, an oil seal 92 which prevents the inflow of a fluid into the cylinder 22 is provided on the side wall 12b side relative to the bearing 91B. Since a pair of side plates 23 and 24 is rotatably supported in the first shaft 21, the cylinder 22 can be considered such that it is rotatably supported in the first shaft 21. As shown in FIG. 4, the direction in which a pair of side plates 23 and 24 and the cylinder 22 rotate with respect to the central axis AX of the first shaft 21 is defined as a circumferential direction θ.

The magnet drum 20 further comprises a inner cylinder 27 secured to the first shaft 21 inside the cylinder 22, and the magnet 26 provided on the outer circumferential surface 271 of the inner cylinder 27. The inner cylinder 27 is also called a yoke. The inner cylinder 27 does not rotate with respect to the first shaft 21. As shown in FIG. 4 and FIG. 6, the magnet 26 comprises a plurality of magnets provided in the circumferential direction θ on the outer circumferential surface 271 of the inner cylinder 27 and extending in the first direction X. The outer circumferential surface 271 of the inner cylinder 27 comprises a portion in which the magnet 26 is provided and a portion in which the magnet 26 is not provided.

The magnet 26 faces the inner circumferential surface 222 of the cylinder 22. As shown in FIG. 6, in the area in which the magnet 26 faces the inner circumferential surface 222 of the cylinder 22, a magnetic field area MA to which a magnetic material can be attached is formed on the outer circumferential surface 221. The magnetic field area MA is formed in a certain range in the circumferential direction θ of the outer circumferential surface 221. This range can be appropriately changed. The magnetic field area MA is, for example, an area which is subjected to a relatively strong effect of the magnetic field of the magnet 26.

In the area in which the magnet 26 does not face the inner circumferential surface 222 of the cylinder 22, a nonmagnetic field area NMA is formed on the outer circumferential surface 221. The nonmagnetic field area NMA is an area which is not substantially affected by the magnetic field of the magnet 26, or an area in which the effect of the magnetic field of the magnet 26 is less than that of the magnetic field area MA. As shown in FIG. 6, the distal end of the scraper 41 faces, for example, the nonmagnetic field area NMA.

The magnet 26 is, for example, a permanent magnet. The magnets included in the magnet 26 are provided such that, for example, the north and south poles are alternated. A gap is defined between the magnet 26 and the inner circumferential surface 222. This gap may be constant or may not be constant in the circumferential direction θ.

The magnet drum 20 further comprises a second shaft 25 provided in the side plate 23 and extending toward the outside of the separator body 10. The second shaft 25 extends parallel to the central axis AX of the first shaft 21 and is provided on the same line as the central axis AX of the first shaft 21. For example, the second shaft 25 is formed integrally with the side plate 23. The second shaft 25 penetrates the side wall 12a of the separator body 10 and a hole portion 332a provided in the second bracket 332. In the side wall 12a, for example, a cutout through which the second shaft 25 passes and which is open toward the upper side is provided.

The second shaft 25 comprises an input portion 251 on the opposite side of the side plate 23. The second shaft 25 is connected to the speed reducer 32 in the input portion 251. In the example shown in FIG. 4, the input portion 251 is more distant from the side wall 12a than the second bracket 332. In the end portion of the second shaft 25 on the side plate 23 side, a diameter expansion portion 252 in which the outside diameter is greater than that of the portion located outside the separator body 10 is formed.

In the side wall 12a, a discoid housing 93 which supports the second shaft 25 is provided. The housing 93 is detachably attached to the side wall 12a by a screw, etc. In the central portion of the housing 93, a hole portion 931 into which the second shaft 25 is inserted is formed in the first direction X.

In part of the hole portion 931, a bearing 94 for rotatably supporting the second shaft 25 and an oil seal 95 which prevents the outflow of a fluid into the outside of the separator body 10 are provided. The oil seal 95 and the bearing 94 are arranged in this order from the side wall 12a side in the opposite direction of the first direction X. The housing 93 is formed of, for example, a metal material such as stainless steel or iron.

The driving portion 30 is connected to the second shaft 25 outside the separator body 10. The speed reducer 32 comprises an output portion 321. The output portion 321 is, for example, a hollow shaft. The speed reducer 32 comprises a mechanism which transmits the driving force of the motor 31 connected to the speed reducer 32 to the output portion 321 and rotates the output portion 321 around the rotation axis. The rotation axis of the output portion 321 is located on the same line as the central axis AX of the first shaft 21.

The input portion 251 of the second shaft 25 is inserted into the output portion 321. The input portion 251 is connected to the output portion 321 by, for example, a key connection. The input portion 251 rotates together with the output portion 321. On the outer circumferential surface of the input portion 251, for example, a recess portion for attaching a key is formed.

When the motor 31 is driven, the second shaft 25 inserted into the output portion 321 of the speed reducer 32 rotates, and the cylinder 22 rotates with respect to the central axis AX of the first shaft 21 together with the second shaft 25 and the side plates 23 and 24. In the present embodiment, the cylinder 22 rotates in the circumferential direction θ with respect to the central axis AX as shown in FIG. 4.

As shown in FIG. 4 to FIG. 7, the magnet separator 100 further comprises a bottom plate 13 and a pair of partition plates 14A and 14B inside the separator body 10. The bottom plate 13 is provided so as to be spaced apart from the outer circumferential surface 221 along the outer circumferential surface 221 inside the separator body 10. As shown in FIG. 5 to FIG. 7, an inner wall 16 extending from the bottom wall 11 toward the bottom plate 13 is connected to the end portion of the bottom plate 13 on the side wall 12c side.

The inner wall 16 inclines so as to approach the bottom wall 11 from the side wall 12d to the side wall 12c in the second direction Y. The inner wall 16 may be provided parallel to the first direction X and the third direction Z. Further, as shown in FIG. 5 and FIG. 7, a pair of inner walls 17A and 17B extending in the third direction Z is connected to the end portion of the bottom plate 13 on the side wall 12c side. In the example shown in the figures, the pair of inner walls 17A and 17B comprises an inclined portion connected to the end portion of the bottom plate 13, a portion parallel to the first direction X and the third direction Z and a portion parallel to the second direction Y and the third direction Z.

The bottom plate 13 and the partition plates 14A and 14B are supported in the inside of the separator body 10 by, for example, a support provided from the side wall 12a toward the partition plate 14A and a support provided from the side wall 12b toward the partition plate 14B. The inner wall 16 is connected to the side walls 12a and 12b in the first direction X. In the first direction X, an end of the inner wall 17A is connected to the side wall 12a, and an end of the inner wall 17B is connected to the side wall 12b.

The storage portion 10a which stores the fluid discharged from a machine tool is included in the portion surrounded by the bottom wall 11, the side walls 12a, 12b and 12c, the inner wall 16 and a pair of inner walls 17A and 17B. In FIG. 5 and FIG. 6, the fluid level during the operation of the magnet separator 100 is shown by fluid level 10L.

Moreover, as shown in FIG. 4, FIG. 6 and FIG. 7, the channel 80 to which a fluid is supplied from the storage portion 10a is formed between the bottom plate 13 and the outer circumferential surface 221 of the cylinder 22. The channel 80 comprises an inflow port 80a on the side wall 12c side which is the upstream side and an outflow port 80b on the side wall 12d side which is the downstream side. In FIG. 6, the fluid level of the fluid which flows between the bottom plate 13 and the outer circumferential surface 221 in the channel 80 is shown by fluid level 80L.

As shown in FIG. 6, the cylinder 22 is provided such that, for example, the lower portion of the outer circumferential surface 221 is immersed in the fluid in the channel 80, and the upper portion of the outer circumferential surface 221 is exposed from the fluid level of the channel 80. For example, the magnetic field area MA is formed over a range including the area facing the squeeze roller 51 from the area immersed in the fluid on the outer circumferential surface 221 of the cylinder 22.

The distance between the bottom plate 13 and the outer circumferential surface 221 may be constant from the inflow port 80a to the outflow port 80b. The distance between the bottom plate 13 and the outer circumferential surface 221 may be decreased from the inflow port 80a toward the outflow port 80b or may be increased from the inflow port 80a toward the outflow port 80b. Regarding the distance between the bottom plate 13 and the outer circumferential surface 221, a wide portion or narrow portion along the channel 80 may be provided. Further, for example, the distance between the bottom plate 13 and the outer circumferential surface 221 is constant in the first direction X as shown in FIG. 4.

As shown in FIG. 4, a pair of partition plates 14A and 14B is provided in the bottom plate 13. The partition plate 14A is located between the side plate 23 and the side wall 12a. The partition plate 14B is located between the side plate 24 and the side wall 12b. The pair of partition plates 14A and 14B extends from the bottom plate 13 toward the central axis AX. As shown in FIG. 5, the partition plate 14A has, for example, a shape including an arc along the bottom plate 13, and comprises a cutout 141 which is open toward the upper side for the insertion of the second shaft 25.

The cutout 141 has, for example, a shape including an arc along the outer circumferential surface of the diameter expansion portion 252 of the second shaft 25. For example, the cutout 141 is provided above fluid level 10L which is the fluid level during operation. The rim 141a of the cutout 141 is located at a higher position than fluid level 10L which is the fluid level during operation.

As shown in FIG. 4, a cutout 142 which is open toward the upper side for the insertion of the first shaft 21 is also provided in the partition plate 14B. The cutout 142 has, for example, a shape including an arc along the outer circumferential surface of the first shaft 21 and is provided above fluid level 10L which is the fluid level during operation. Therefore, a fluid does not easily flow out of the cutout 141 or 142 during the operation of the magnet separator 100.

A discharge port 10b is formed between the bottom wall 11 and the bottom plate 13, between the side wall 12a and the partition plate 14A and between the side wall 12b and the partition plate 14B. The fluid from which foreign substances have been separated and removed is supplied to the discharge port 10b mainly from the outflow port 80b of the channel 80. The pair of inner walls 17A and 17B prevents a fluid from flowing from the storage portion 10a into the discharge port 10b.

As shown in FIG. 4, the magnet separator 100 further comprises current plates 15A to 15D provided between the bottom plate 13 and the outer circumferential surface 221. Each of the current plates 15A to 15D comprises a surface 151 facing the outer circumferential surface 221. The current plates 15A and 15B are located on the end portion 22a side of the cylinder 22, and are arranged in the order of the current plate 15B and the current plate 15A in the first direction X. The current plates 15C and 15D are located on the end portion 22b side of the cylinder 22, and are arranged in the order of the current plate 15C and the current plate 15D in the first direction X.

The current plates 15A and 15B and the partition plate 14A are in contact with each other. The current plates 15C and 15D and the partition plate 14B are in contact with each other. The surface 151 provided in each of the current plates 15A and 15B faces the outer circumferential surface 221 located in the end portion 22a of the cylinder 22. The surface 151 provided in each of the current plates 15C and 15D faces the outer circumferential surface 221 located in the end portion 22b of the cylinder 22. The current plates 15A to 15D have the same shape.

As shown in FIG. 6, the surface 151 of the current plate 15C has a curved shape along the outer circumferential surface 221. The surface 151 extends in the first direction X. The current plate 15C comprises a surface along the bottom plate 13 on the opposite side of the surface 151, and an end portion located on the side wall 12d side relative to the bottom plate 13. The current plates 15A to 15D extend so as to include the range in which the outer circumferential surface 221 of the cylinder 22 is immersed in the fluid in the second direction Y. For example, none of the current plates 15A to 15D overlaps the magnet 26 in the first direction X or the third direction Z as shown in FIG. 4.

This specification explains each gap defined on the end portion 22a side of the cylinder 22 with reference to FIG. 8. It should be noted that a similar configuration is applied to the end portion 22b side of the cylinder 22. The gap G1 defined between the partition plate 14A and the side plate 23 is small. A simple labyrinth structure is formed in gap G1. For example, gap G1 is defined with a constant distance in the third direction Z.

For example, the gap G1 defined between the partition plate 14A and the side plate 23 is smaller than the gap G2 defined between the partition plate 14A and the side wall 12a. For example, gap G1 should desirably have a length of 1 to 2 mm. More desirably, gap G1 should have a length of 1 to 1.5 mm. By defining gap G1 in this way, the resistance applied when a fluid passes through gap G1 can be made great.

Gap G3 is defined between the outer circumferential surface 221 of the cylinder 22 and the surface 151 of each of the current plates 15A and 15B. For example, gap G3 is defined with a constant distance in the first direction X. Gap G3 is smaller than the gap between the bottom plate 13 and the outer circumferential surface 221 of the cylinder 22 in the central portion of the channel 80 in the first direction X. For example, gap G3 should desirably have a length of 1 to 2 mm. More desirably, gap G3 should have a length of 1 to 1.5 mm. Thus, the fluid flowing through the channel 80 or the foreign substance contained in the fluid is not easily supplied from the channel 80 to gap G3.

For example, gap G3 is equal to gap G1 or smaller than gap G1 (G1≥G3). Gaps G1 and G3 are smaller than gap G2 (G2>G1≥G3). For example, when gap G1 is smaller than gap G3, the fluid which has been supplied to gap G3 or the foreign substance contained in the fluid is not easily supplied to gap G1.

As shown in FIG. 4, the magnet separator 100 further comprises a third shaft 53 provided parallel to the cylinder 22 on the upper side of the magnet drum 20, the squeeze roller 51 provided in the third shaft 53, and a pair of squeeze roller adjustment mechanisms 52A and 52B provided in the third shaft 53 on the both sides of the squeeze roller 51. The squeeze roller 51 can squeeze the fluid contained in the magnetic material attached to the outer circumferential surface 221 of the cylinder 22. By the pair of squeeze roller adjustment mechanisms 52A and 52B, the distance between the first shaft 21 and the third shaft 53 can be adjusted.

As shown in FIG. 5 and FIG. 6, the squeeze roller 51 is provided on the side wall 12c side in the upper portion of the outer circumferential surface 221 of the cylinder 22. The pair of squeeze roller adjustment mechanisms 52A and 52B rotatably supports the third shaft 53. As the third shaft 53 is rotatably supported by the pair of squeeze roller adjustment mechanisms 52A and 52B, the squeeze roller 51 can be considered such that it is rotatably supported. The outer circumferential surface 511 of the squeeze roller 51 is formed of, for example, hard rubber.

In the example shown in FIG. 5 and FIG. 6, the outer circumferential surface 511 of the squeeze roller 51 is in contact with the outer circumferential surface 221 of the cylinder 22. In this case, the outer circumferential surface 511 of the squeeze roller 51 is in contact with the outer circumferential surface 221 of the cylinder 22 at a predetermined pressure by the pair of squeeze roller adjustment mechanisms 52A and 52B.

As shown in FIG. 4, the first rotating body 61 is provided between the side wall 12a and the second bracket 332 in the second shaft 25 outside the separator body 10. The first rotating body 61 is, for example, a sprocket. The central axis of the first rotating body 61 is located on the same line as the central axis AX of the first shaft 21.

The second shaft 25 is inserted into a hole portion 611 which penetrates the first rotating body 61 in the first direction X and is secured in the hole portion 611. Thus, the first rotating body 61 rotates together with the second shaft 25. The first rotating body 61 is secured to the second shaft 25 by, for example, a key connection. On each of the inner circumferential surface of the hole portion 611 and the outer circumferential surface of the second shaft 25, a recess portion for attaching a key is formed.

In the third shaft 53, the second rotating body 62 is provided at a position which is more distant from the squeeze roller 51 than the squeeze roller adjustment mechanism 52A in the opposite direction of the first direction X. In FIG. 4, the second rotating body 62 is located on the upper side of the first rotating body 61. For example, the second rotating body 62 is a discoid member in which a roller chain 621 engaging with teeth 612 provided in the first rotating body 61 is provided on the outer circumferential surface. The central axis of the second rotating body 62 is located on the same line as the central axis of the third shaft 53.

The third shaft 53 is inserted into a hole portion which penetrates the second rotating body 62 in the first direction X and is secured in the hole portion. Thus, the second rotating body 62 rotates together with the third shaft 53. In a manner similar to that of the first rotating body 61, for example, the second rotating body 62 is secured to the third shaft 53 by a key connection, etc.

The transmission mechanism 60 transmits the rotation of the second shaft 25 to the third shaft 53. In other words, when the first rotating body 61 connected to the second shaft 25 rotates, the rotation driving force is transmitted to the second rotating body 62 comprising the roller chain 621 engaging with the teeth 612 of the first rotating body 61, and the third shaft 53 rotates together with the second rotating body 62. Further, the squeeze roller 51 rotates together with the third shaft 53. In the present embodiment, the squeeze roller 51 rotates in the opposite direction of the circumferential direction θ which is the rotation direction of the cylinder 22.

As shown in FIG. 6, for example, the scraper 41 faces the outer circumferential surface 221 in the opposite direction of the circumferential direction θ of the cylinder 22 in the tangential direction of the outer circumferential surface 221 of the cylinder 22. The distal end of the scraper 41 extends in the central axis AX of the first shaft 21. For example, the scraper 41 is provided over substantially the entire width of the cylinder 22. In the example shown in FIG. 6, the distal end of the scraper 41 is in contact with the outer circumferential surface 221 of the cylinder 22.

Now, this specification explains the flow of the fluid in the magnet separator 100 with reference to FIG. 6. First, the fluid discharged from a machine tool is put from the upper side of the separator body 10 and is temporarily stored in the storage portion 10a. The fluid stored in the storage portion 10a is supplied from the inflow port 80a to the channel 80 and moves in the channel 80 along the outer circumferential surface 221 of the cylinder 22.

As the magnetic field area MA is formed in, of the outer circumferential surface 221 of the cylinder 22, the area immersed in the fluid, the foreign substances containing the magnetic material of the fluid are attached to the outer circumferential surface 221 of the cylinder 22 when passing through the channel 80. The cylinder 22 rotates in the opposite direction of the flowing direction of the fluid which flows in the channel 80, in other words, rotates in the circumferential direction θ. Before the foreign substances attached to the outer circumferential surface 221 are scraped by the scraper 41, the fluid is squeezed by the squeeze roller 51.

The foreign substances in which the fluid has been squeezed by the squeeze roller 51 are scraped by the scraper 41 from the outer circumferential surface 221, and are discharged from the foreign substance discharge port 42 to the outside of the separator body 10. The fluid which has passed through the channel 80 and from which foreign substances have been separated and removed passes through the discharge portion 10b from the outflow port 80b to the bottom wall 11 and is discharged from the fluid discharge port 11a to the outside of the separator body 10 (for example, a cleaning tank).

As shown in FIG. 7, in the first direction X (horizontal direction), the width Wb of the outflow port 80b is greater than the width Wa of the inflow port 80a between a pair of inner walls 17A and 17B. The width Wb of the outflow port 80b is less than the width Wc of the storage portion 10a. In other words, the width Wc of the storage portion 10a, the width Wb of the outflow port 80b and the width Wa of the inflow port 80a decrease in this order (Wc>Wb>Wa).

For example, the inflow width as the length in which the fluid is supplied from the storage portion 10a in the first direction X can be adjusted by making the width Wa of the inflow port 80a less than the width Wc of the storage portion 10a. By adjusting the inflow width, the fluid can be supplied to, of the outer circumferential surface 221 of the cylinder 22, the portion in which the magnetic force is effectual, and the magnetic material can be effectively attached to the outer circumferential surface 221. In the present embodiment, the inner wall 16 inclines. Thus, the fluid is easily supplied from the storage portion 10a to the channel 80.

Figure 9:
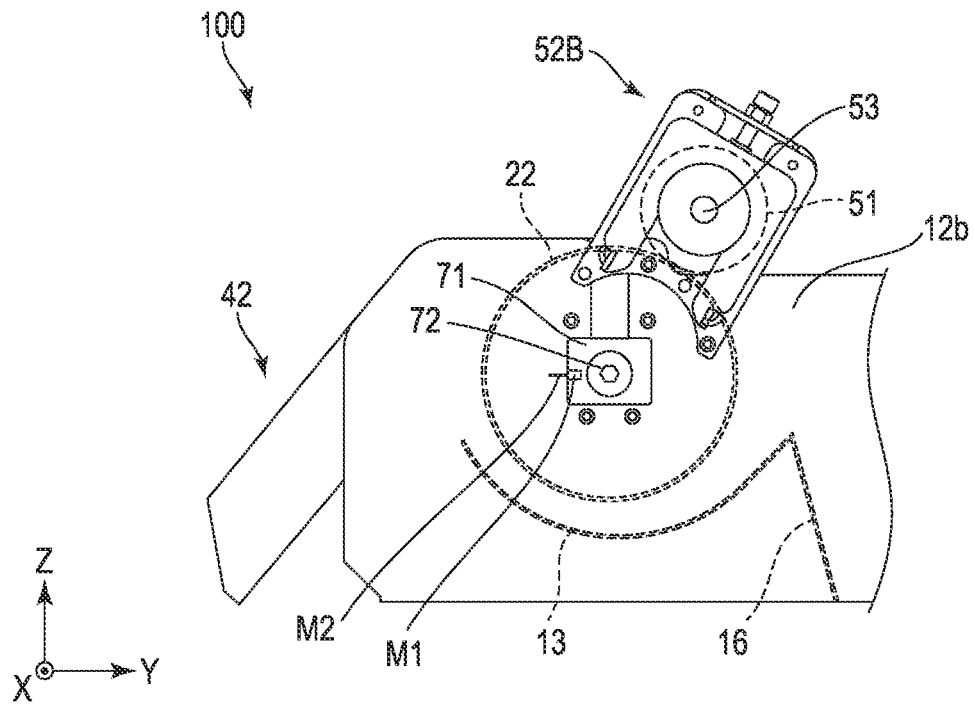
FIG. 9 is a schematic partial side view showing a magnet adjustment tool provided in the magnet separator.
Figure 10:
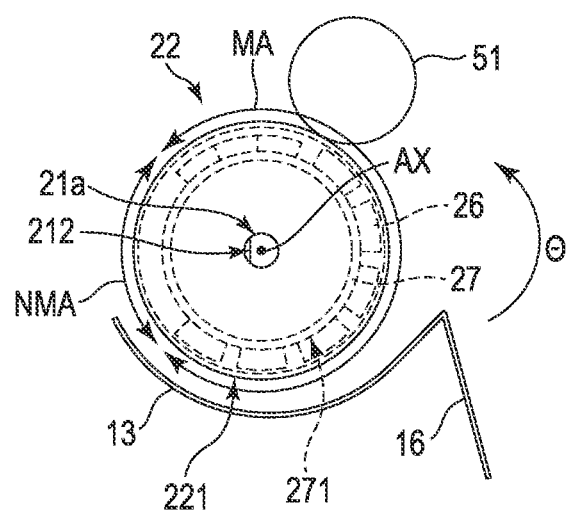
FIG. 10 is a schematic diagram showing the position of a magnet before it is adjusted by the magnet adjustment tool.

FIG. 9 is a schematic partial side view showing the magnet adjustment tool 71 provided in the magnet separator 100. FIG. 10 is a schematic diagram showing the position of the magnet 26 before it is adjusted by the magnet adjustment tool 71. FIG. 10 shows, for example, the position of the magnet 26 at the time of manufacturing (shipping).

As shown in FIG. 9, the magnet adjustment tool 71 is a rectangular plate formed of, for example, a metal material such as stainless steel or iron. As explained with reference to FIG. 4, the magnet adjustment tool 71 is attached to the end portion 21a of the first shaft 21. Thus, when the magnet adjustment tool 71 is rotated, the first shaft 21 can be rotated.

As the magnet 26 is provided on the outer circumferential surface 271 of the inner cylinder 27 secured to the first shaft 21, the position of the magnet 26 with respect to the central axis AX can be adjusted in the circumferential direction θ by rotating the first shaft 21 together with the magnet adjustment tool 71. In another respect, when the first shaft 21 is rotated by the magnet adjustment tool 71, the position of the magnetic field area MA formed on the outer circumferential surface 221 can be adjusted in the circumferential direction θ, and the positions of the magnetic field area MA and the nonmagnetic field area NMA with respect to the squeeze roller 51 and the distal end of the scraper 41 can be adjusted.

The end portion 21a of the first shaft 21 is connected such that the first shaft 21 rotates together with the magnet adjustment tool 71 when the magnet adjustment tool 71 is rotated. In the example shown in FIG. 10, the end portion 21a of the first shaft 21 has, for example, a D-shape in the opposite direction of the first direction X, and comprises a surface 212.

The magnet adjustment tool 71 comprises a hole portion having the same shape fitting with the end portion 21a. The shape of the end portion 21a is not limited to the example described above and may be another shape. As long as the magnet adjustment tool 71 rotates together with the first shaft 21, the magnet adjustment tool 71 may be attached to the first shaft 21 by another method such as adhesive bonding or screwing.

In the example shown in the figure, the magnet adjustment tool 71 comprises mark M1 on the surface on the opposite side of the surface facing the side wall 12b. Mark M1 is, for example, a scale indicating an adjustable range. Mark M1 is formed in the end portion on the side wall 12d side.

The side wall 12b comprises mark M2 at a position facing mark M1 in the second direction Y. Mark M2 is formed parallel to the second direction Y. For example, the width of mark M1 is greater than that of mark M2 in the third direction Z. The positions at which mark M1 and mark M2 are formed are not limited to the example described above. In the example shown in FIG. 9, mark M2 indicates substantially the central portion of mark M1 in the third direction Z.

Figure 11:
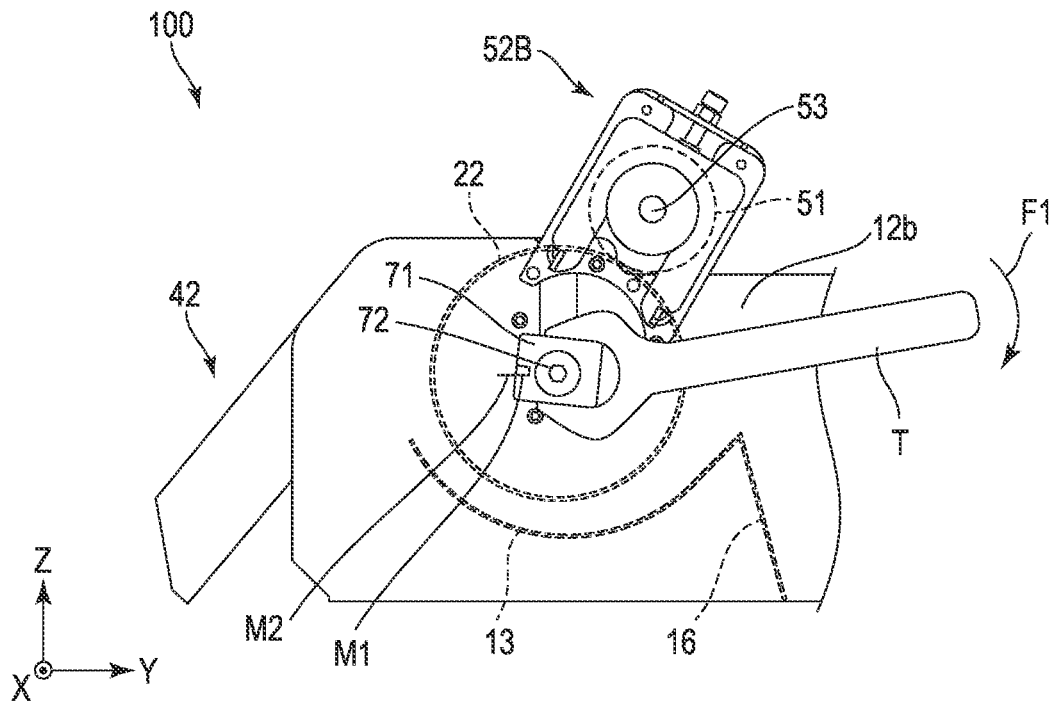
FIG. 11 is a schematic partial side view for explaining the adjustment of the magnet by the magnet adjustment tool.
Figure 12:
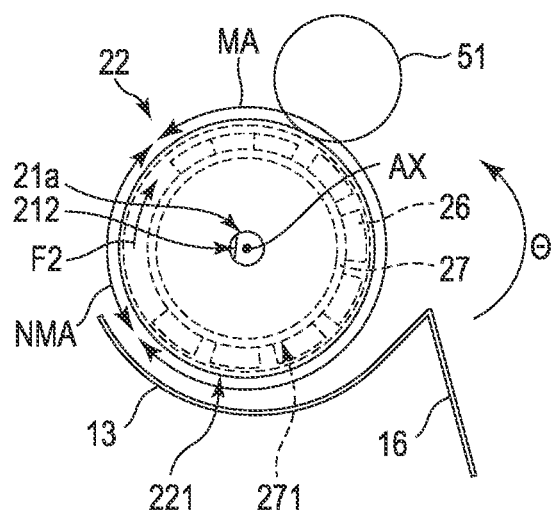
FIG. 12 is a schematic diagram showing the position of the magnet after it is adjusted by the magnet adjustment tool.
Figure 13:
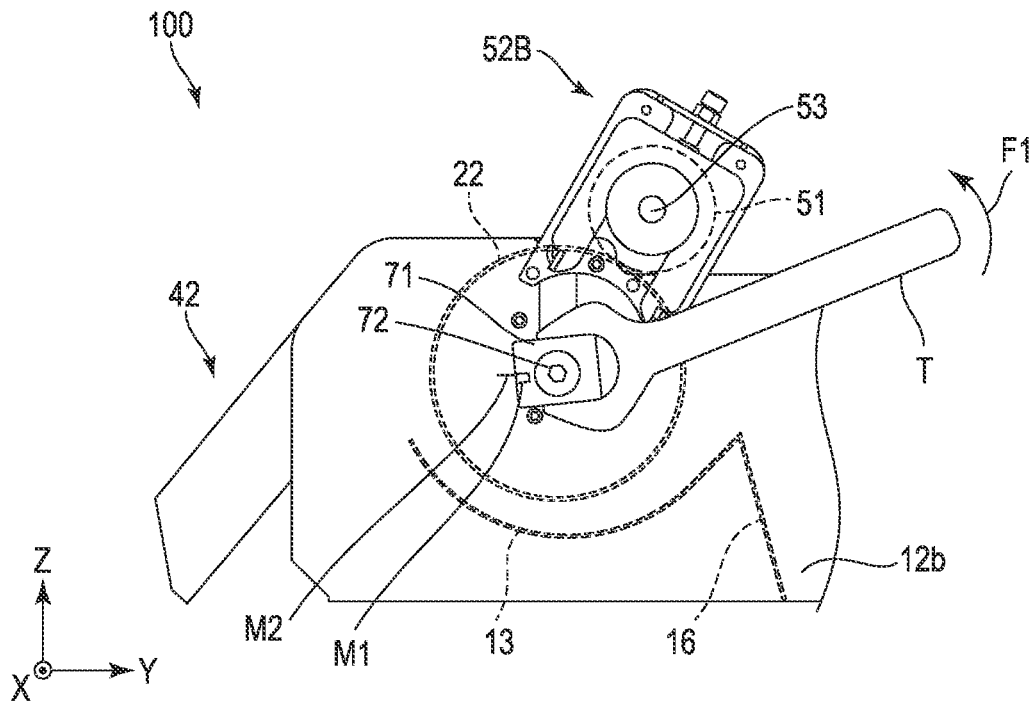
FIG. 13 is a schematic partial side view for explaining the adjustment of the magnet by the magnet adjustment tool.
Figure 14:
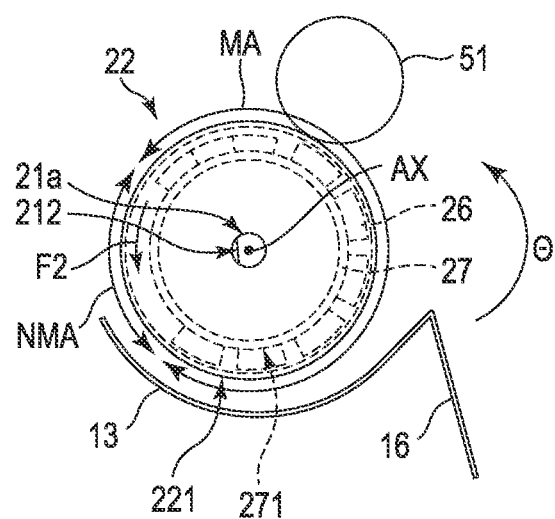
FIG. 14 is a schematic diagram showing the position of the magnet after it is adjusted by the magnet adjustment tool.

FIG. 11 and FIG. 13 are schematic partial side views for explaining the adjustment of the magnet 26 by the magnet adjustment tool 71. FIG. 12 and FIG. 14 are schematic diagrams showing the position of the magnet 26 after it is adjusted by the magnet adjustment tool 71. The adjustment of the position of the magnet 26 by the magnet adjustment tool 71 is performed by the following procedure.

First, the securing member 72 secured to the end portion 21a of the first shaft 21 is loosened. Subsequently, as shown in FIG. 11 and FIG. 13, the magnet adjustment tool 71 is rotated by a tool T to move the magnet 26 to a desired position. The adjustable range of the magnet 26 is, for example, a range of approximately −5 degrees to +5 degrees with respect to the central axis AX from the state shown in FIG. 9.

The tool T should be preferably able to hold the side surfaces of the magnet adjustment tool 71 like a spanner. The shape of the magnet adjustment tool 71 is not limited to a rectangular shape and may be another shape as long as it can be held by the tool T, etc. After the magnet 26 is moved, the securing member 72 is fastened lastly to secure the first shaft 21 and the magnet adjustment tool 71 to the separator body 10.

In the example shown in FIG. 11, the magnet adjustment tool 71 is rotated in the direction shown by arrow F1 by the tool T. At this time, mark M2 points the lower side of mark M1 in the third direction Z. In this case, as shown in FIG. 12, the magnet 26 moves in the opposite direction of the circumferential direction θ shown by arrow F2 together with the first shaft 21 and the inner cylinder 27. When the magnet 26 is moved, the magnetic field area MA and the nonmagnetic field area NMA formed on the outer circumferential surface 221 move in the same direction.

In the example shown in FIG. 13, the magnet adjustment tool 71 is rotated in the direction shown by arrow F1 by the tool T. This direction is the opposite direction of the example shown in FIG. 11. At this time, mark M2 points the upper side of mark M1 in the third direction Z. In this case, as shown in FIG. 14, the magnet 26 moves in the circumferential direction θ shown by arrow F2 together with the first shaft 21 and the inner cylinder 27. When the magnet 26 is moved, the magnetic field area MA and the nonmagnetic field area NMA formed on the outer circumferential surface 221 move in the same direction.

As the magnet adjustment tool 71 is provided outside the separator body 10, the position of the magnet 26 can be adjusted from the outside of the separator body 10 without detaching the magnet drum 20, etc., from the separator body 10.

Figure 15:
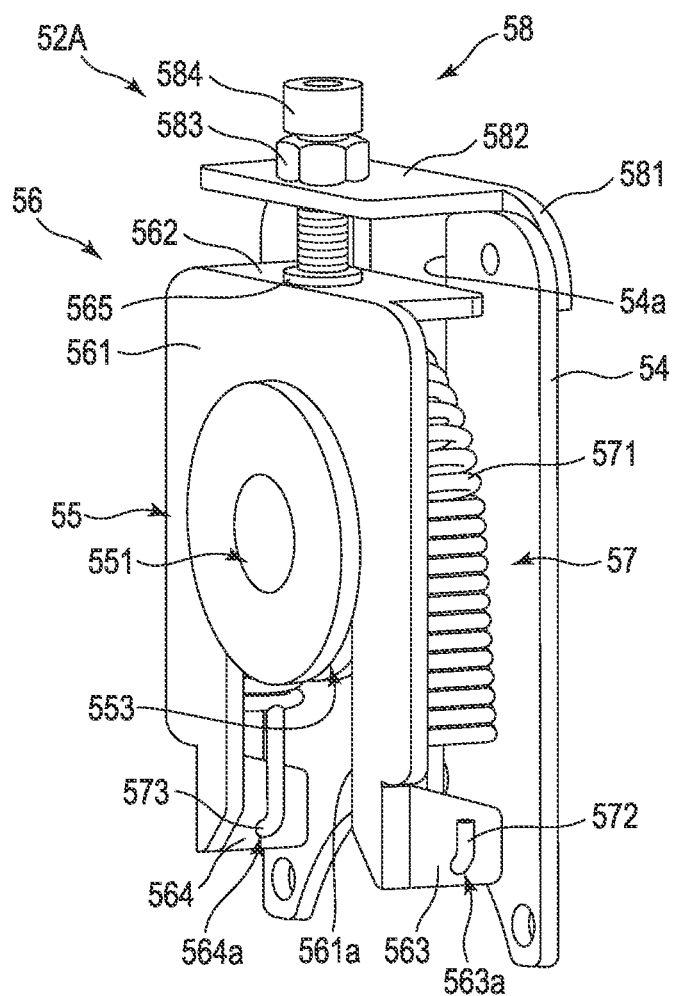
FIG. 15 is a schematic perspective view showing a squeeze roller adjustment mechanism.
Figure 16:
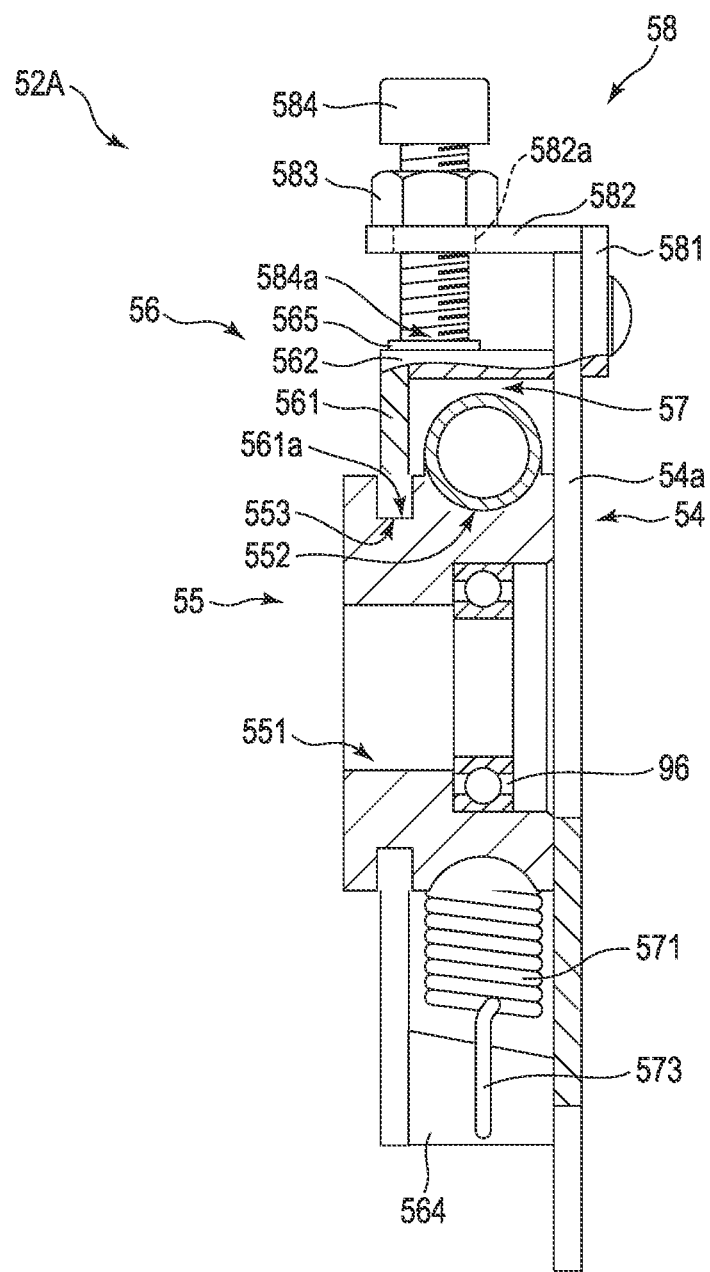
FIG. 16 is a schematic partial cross-sectional view showing the squeeze roller adjustment mechanism.

FIG. 15 is a schematic perspective view showing the squeeze roller adjustment mechanism 52A. FIG. 16 is a schematic partial cross-sectional view showing the squeeze roller adjustment mechanism 52A. In FIG. 15 and FIG. 16, the squeeze roller adjustment mechanism 52A is explained. It should be noted that the squeeze roller adjustment mechanism 52B comprises a similar structure.

As shown in FIG. 15 and FIG. 16, the squeeze roller adjustment mechanism 52A comprises an attachment plate 54, a first spring receiver 55, a second spring receiver 56, a tension coil spring 57 and an adjustment portion 58. The attachment plate 54, the first spring receiver 55, the second spring receiver 56 and the adjustment portion 58 are formed of a metal material such as stainless steel or iron, a resinous material, etc.

The attachment plate 54 comprises a cutout 54a which is open toward the upper side for the insertion of the third shaft 53. The squeeze roller adjustment mechanism 52A is detachably attached to the upper side of the side wall 12a by a screw, etc., via the attachment plate 54.

The first spring receiver 55 is formed cylindrically. In the central portion of the first spring receiver 55, a hole portion 551 into which the third shaft 53 is inserted is formed in the axial direction. In part of the hole portion 551, a bearing 96 for rotatably supporting the third shaft 53 is provided. On the outer circumferential surface of the first spring receiver 55, a spring receiver groove 552 for winding the tension coil spring 57 and a guide groove 553 which fits with the second spring receiver 56 are formed. The spring receiver groove 552 and the guide groove 553 are arranged in this order from the attachment plate 54 side in the axial direction of the first spring receiver 55.

The second spring receiver 56 comprises a first portion 561 facing the attachment plate 54, and a second portion 562 connected to the upper end portion of the first portion 561.

Regarding the second portion 562, for example, the upper end portion of the first portion 561 is bent at substantially a right angle toward the attachment plate 54. The second portion 562 covers the spring receiver groove 552 of the first spring receiver 55 from the upper side.

In the first portion 561, a cutout 561a which is open toward the lower side is formed. In the example shown in FIG. 15 and FIG. 16, the rim of the cutout 561a of the second spring receiver 56 slidably fits into the guide groove 553 of the first spring receiver 55.

A pair of hooking portions 563 and 564 bent on the attachment plate 54 side so as to face each other is formed in the lower end portion of the first portion 561. The hooking portions 563 and 564 comprise hole portions 563a and 564a, respectively. The hole portions 563a and 564a are, for example, circular or rectangular.

The tension coil spring 57 comprises a coil portion 571 which can be elastically deformed, and a pair of hook portions 572 and 573 formed in the both ends of the coil portion 571. The coil portion 57 is wound around the spring receiver groove 552 from the upper side of the first spring receiver 55. The hook portions 572 and 573 are attached to the hole portions 563a and 564a provided in the hook portions 563 and 564, respectively. On the upper surface of the second portion 562, a contact portion 565 which protrudes toward the upper side relative to the other portion is provided.

The tension coil spring 57 is formed between the first spring receiver 55 and the second spring receiver 56 in a state in which the coil portion 571 is arcuately wound along the first spring receiver 55. The tension coil spring 57 biases the first spring receiver 55 by an elastic force in a direction approaching the pair of hooking portions 563 and 563 provided in the second spring receiver 56.

The adjustment portion 58 comprises a first portion 581 attached to the attachment plate 54, a second portion 582 connected to the upper end portion of the first portion 561, an adjustment nut 583 provided in the central portion of the second portion 582, and an adjustment bolt 584. The first portion 581 is detachably attached to the upper side of the surface of the side wall 12a side of the attachment plate 54 by a screw, etc.

The second portion 582 of the adjustment portion 58 is bent at substantially a right angle such that, for example, the upper end portion of the first portion 581 faces the second portion 562 of the second spring receiver 56. The adjustment bolt 584 is, for example, a hexagon socket head bolt or a cross recessed head hexagon bolt.

As shown in FIG. 15 and FIG. 16, the second portion 562 of the second spring receiver is provided substantially parallel to the second portion 582 of the adjustment portion 58. The adjustment bolt 584 is screwed into the adjustment nut 583 provided on the upper surface of the second portion 582 from the upper side, and penetrates a hole portion 582a provided in the second portion 582.

The distal end 584a of the adjustment bolt 584 is in contact with the contact portion 565 of the second spring receiver 56. The second spring receiver 56 can be pressed toward the lower side in the distal end 584a by screwing the adjustment bolt 584 into the adjustment nut 583.

For example, when the adjustment bolt 584 is rotated relative to the adjustment nut 583 so as to move to the lower side, the second spring receiver 56 moves in a direction moving away from the second portion 582, and the hook portions 572 and 573 attached to the pair of hooking portions 563 and 564 are pulled, and the coil portion 571 presses the first spring receiver 55 via the spring receiver groove 552.

When the first spring receiver 55 is pressed, the squeeze roller 51 moves in a direction approaching the outer circumferential surface 221 of the cylinder 22 together with the third shaft 53 connected to the first spring receiver 55.

In another respect, the tension coil spring 57 biases the squeeze roller 51 in a direction pressing the squeeze roller 51 onto the outer circumferential surface 221 of the cylinder 22 together with the third shaft 53 via the first spring receiver 55. For example, when the squeeze roller 51 is in contact with the outer circumferential surface 221 of the cylinder 22 at a predetermined pressure, the pressure can be increased by rotating the adjustment bolt 584 such that the adjustment bolt 584 moves to the lower side.

When the adjustment bolt 584 is rotated relative to the adjustment nut 583 such that the adjustment bolt 584 moves to the upper side, the second spring receiver 56 moves in a direction approaching the second portion 582, and the force in which the coil portion 571 presses the first spring receiver 55 via the spring receiver groove 552 is decreased. When the force for pressing the first spring receiver 55 is decreased, the squeeze roller 51 moves in a direction moving away from the outer circumferential surface 221 of the cylinder 22 together with the third shaft 53 connected to the first spring receiver 55. For example, when the squeeze roller 51 is in contact with the outer circumferential surface 221 of the cylinder 22 at a predetermined pressure, the pressure can be decreased by rotating the adjustment bolt 584 such that the adjustment bolt 584 moves to the upper side.

In other words, when the amount of screwing of the adjustment bolt 584 relative to the adjustment nut 583 is adjusted, the squeeze roller 51 moves in a direction approaching the outer circumferential surface 221 of the cylinder 22 or a direction moving away from the outer circumferential surface 221 of the cylinder 22 together with the third shaft 53. Thus, the third shaft 53 can be adjusted in a direction approaching the first shaft 21 or moving away from the first shaft 21.

The embodiment explained above can provide the magnet separator 100 which is not easily affected by foreign substances such as the magnetic material contained in a fluid, etc., and has high durability. In other words, in the present embodiment, as the second shaft 25 which rotates the cylinder 22 extends toward the outside of the separator body 10, and the driving portion 30 is connected to the second shaft 25 outside the separator body 10, the driving portion 30 is not easily affected by a fluid or foreign substances such as the magnetic material contained in the fluid.

When gaps G1 and G3 explained with reference to FIG. 8 are defined by the partition plates 14A and 14B and the current plates 15A to 15D, the fluid which flows through the channel 80 or the foreign substance contained in the fluid is not easily supplied from the channel 80 to gap G1 or G3. As the partition plates 14A and 14B comprise the cutouts 141 and 142 explained with reference to FIG. 4 and FIG. 5, the fluid does not substantially flow into gap G2 beyond the partition 14A or 14B during the operation of the magnet separator 100.

Further, the inflow of the fluid from the storage portion 10a to the discharge portion 10b is prevented by a pair of inner walls 17A and 17B. As the fluid does not substantially flow into the discharge portion 10b excluding from the outflow port 80b, the fluid level of the fluid in the discharge portion 10b does not easily rise to the position of the first shaft 21, the second shaft 25 or the housing 93.

As the rise of the fluid level of the fluid in the discharge portion 10b is prevented, the first shaft 21, the second shaft 25 or the housing 93 is not easily contact with the fluid, and the wear of the oil seals 92 and 95, etc., by foreign substances, etc., is prevented. In this way, the durability of the magnet separator 100 is not easily decreased by the effect of fluids or foreign substances. Thus, the inflow of the fluid into the cylinder 22 or the outflow of the fluid from the housing 93, etc., to the outside of the separator body 10 is difficult to cause.

In the present embodiment, as the input portion 251 of the second shaft 25 is directly connected to the driving portion 30 provided outside the separator body 10, for example, a sprocket which rotates the cylinder 22 or a driving chain is not needed. Thus, the number of components constituting the magnet separator 100 can be reduced, and in addition, the working hours in maintenance, etc., can be shortened.

As the transmission mechanism 60 for rotating the squeeze roller 51 is provided outside the separator body 10, the fluid inside the separator body 10 is not easily attached to the first rotating body 61 or the second rotating body 62. Thus, the effect caused by fluids or foreign substances is prevented. Further, for example, it is possible to replace the first rotating body 61 and the second rotating body 62 provided in the transmission mechanism 60 without removing the magnet drum 20.

In the present embodiment, the output portion (not shown) of the motor 31 provided in the driving portion 30 extends in a direction intersecting with the output portion 321 of the speed reducer 32 and the second shaft 25. Thus, by the driving portion 30 comprising this structure, the dimension of the magnet separator 100 in the first direction X can be made less.

In the present embodiment, as the squeeze roller adjustment mechanisms 52A and 52B are provided on the upper side of the separator body 10, the adjustment of the squeeze roller 51 relative to the cylinder 22 can be performed from the upper side of the separator body 10. As the adjustment bolt 584 is provided on the upper side of the squeeze roller adjustment mechanisms 52A and 52B, even when a work space cannot be assured on the lateral side or lower side of the magnet separator 100, the amount of screwing by the adjustment bolt 584 can be easily adjusted by using a tool, etc., from the upper side.

According to the magnet separator 100 of the present embodiment, necessary work such as the replacement of components and the adjustment of the squeeze roller 51 can be performed outside the separator body 10. In addition to the above explanation, various excellent effects can be obtained from the present embodiment.

Second Embodiment

Figure 17:
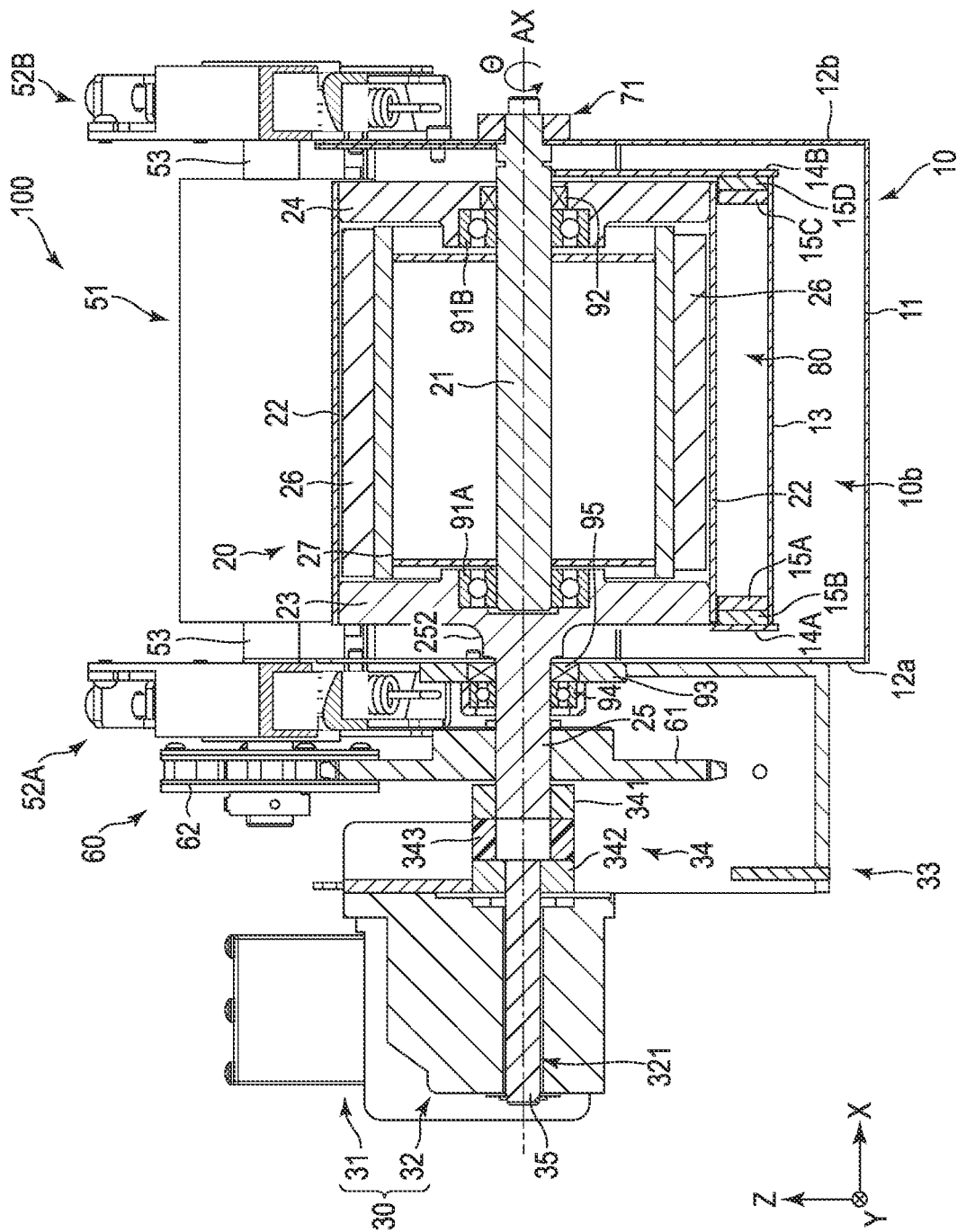
FIG. 17 is a schematic cross-sectional view of a magnet separator according to a second embodiment.

Now, a second embodiment is explained. The same structural elements as the first embodiment are denoted by like reference numbers, description thereof being omitted unless necessary. FIG. 17 is a schematic cross-sectional view of a magnet separator 100 according to the second embodiment. The magnet separator 100 of the second embodiment is different from the first embodiment in respect that it comprises a coupling.

The magnet separator 100 comprises a coupling 34 outside a separator body 10. The coupling 34 connects a second shaft 25 and a fourth shaft 35 which is described later. In the example shown in FIG. 17, the coupling 34 is located between a speed reducer 32 and a first rotating body 61 in the first direction X. The coupling 34 is, for example, a flexible coupling.

The coupling 34 is cylindrical, and comprises connection portions 341 and 342, and a coupling portion 343 provided between the connection portion 341 and the connection portion 342. For example, each of the connection portions 341 and 342 is formed of a metal material, and the coupling portion 343 is formed of a resinous material. The connection portions 341 and 342 comprise hole portions into which the second shaft 25 and the fourth shaft 35 are inserted, respectively.

A driving portion 30 comprises the fourth shaft 35 connected to the output portion 321 of the speed reducer 32. The fourth shaft 35 is inserted into the output portion 321. The axis of the fourth shaft 35 is coincident with the rotation axis of the output portion 321. The axes of the coupling 34 and the fourth shaft 35 are located on the same line as the central axis AX of a first shaft 21. The fourth shaft 35 is secured to the output portion 321 by, for example, a key connection. The length and the shaft diameter of the fourth shaft 35 can be appropriately changed based on the torque necessary to drive the output portion 321 of the speed reducer 32 and the magnet separator 100, etc.

In the example shown in FIG. 17, an end of the second shaft 25 is inserted into the connection portion 341, and an end of the fourth shaft 35 is inserted into the connection portion 342. An end of the second shaft 25 corresponds to, for example, the input portion 251 explained with reference to FIG. 4. The connection portion 341 and the connection portion 342 are connected to each other by the coupling portion 343. The first shaft 21, the second shaft 25 and the connection portions 341 and 342 are connected by various methods. The shape of a bracket 33 can be appropriately changed based on the shape of the coupling 34, etc.

The fourth shaft 35 of the driving portion 30 is connected to the second shaft 25 via the coupling 34 outside the separator body 10. When a motor 31 is driven, the fourth shaft 35 inserted into the output portion 321 of the speed reducer 32 rotates, and the rotation of the fourth shaft 35 is transmitted to the second shaft 25 via the coupling 34.

In the structure of the magnet separator 100 of the second embodiment, effects similar to those of the first embodiment can be obtained. Moreover, in the magnet separator 100 of the second embodiment, errors such as the eccentricity or declination of the fourth shaft 35 relative to the second shaft 25 can be absorbed by the coupling 34. In this way, the assembling property and reliability of the magnet separator 100 can be improved.

The structure of the magnet separator 100 of each embodiment described above is merely an example.

Figure 18:
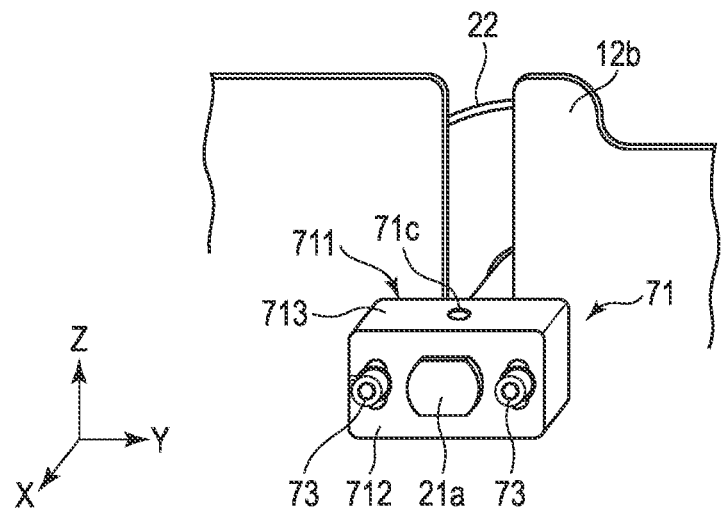
FIG. 18 is a diagram showing a modified example of the magnet adjustment tool provided in the magnet separator.
Figure 19:
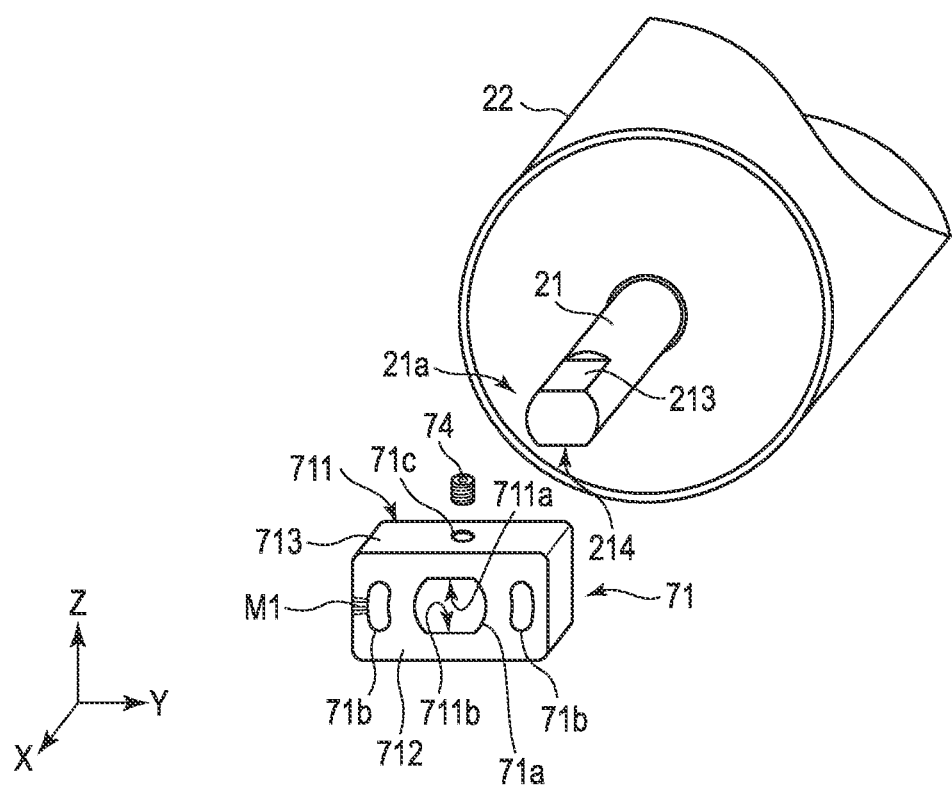
FIG. 19 is a diagram showing a modified example of the magnet adjustment tool provided in the magnet separator.

A modified example of the magnet adjustment tool 71 is shown below. FIG. 18 and FIG. 19 are diagrams showing a modified example of the magnet adjustment tool 71 provided in the magnet separator 100. As shown in FIG. 18 and FIG. 19, a surface 213 and a surface 214 which faces the surface 213 across an intervening gap are formed in the end portion 21a of the first shaft 21. In another respect, the end portion 21a is formed so as to have a bolt width by the surface 213 and the surface 214.

As shown in FIG. 18 and FIG. 19, the magnet adjustment tool 71 is a rectangular plate. The magnet adjustment tool 71 comprises a surface 711 which faces the side wall 12b, a surface 712 which faces the surface 711 across an intervening gap, and an upper surface 713 which connects the surface 711 to the surface 712.

The magnet adjustment tool 71 further comprises a hole portion 71a, a pair of hole portions 71b provided on the both sides of the hole portion 71a in the second direction Y, and a hole portion 71c provided on the upper surface 713. The hole portion 71a and the pair of hole portions 71b penetrate the surface 711 and the surface 712. The hole portion 71c penetrates the upper surface 713 and the hole portion 71a. Screw processing has been applied to the inner circumferential surface of the hole portion 71c.

The hole portion 71a has a shape into which the end portion 21a can fit, and comprises a surface 711a which faces the surface 213 and a surface 711b which faces the surface 214 as shown in FIG. 19. Each hole portion 71b is a long hole which is arcuately formed based on the hole portion 71a. The width of each hole portion 71b based on the hole portion 71a in the circumferential direction can be appropriately changed based on the adjustable range of the magnet 26.

As shown in FIG. 18, the magnet adjustment tool 71 is secured to the side wall 12b by a securing member 73 provided in each hole portion 71b. Each securing member 73 is, for example, a hexagon socket head bolt. However, each securing member 73 may be another type of bolt, etc. As shown in FIG. 19, the magnet adjustment tool 71 is secured to the first shaft 21 by tightening the surface 213 by a securing member 74 provided in the hole portion 71c. The securing member 74 is, for example, a hexagon socket head screw.

The first shaft 21 is supported in the separator body 10 in a cantilever manner by securing the magnet adjustment tool 71 to the side wall 12b in a state where the magnet adjustment tool 71 is secured to the end portion 21a as described above.

The adjustment of the position of the magnet 26 by the magnet adjustment tool 71 is performed by a procedure similar to the procedure explained with reference to FIG. 11 to FIG. 14. In the magnet adjustment tool 71 shown in FIG. 18 and FIG. 19, the adjustment of the magnet 26 can be started by loosening each securing member 73. In the example shown in FIG. 18 and FIG. 19, as the range of the adjustment of the magnet 26 is controlled by a pair of hole portions 71b, the magnet 26 can be more easily adjusted.

A modified example of the squeeze roller adjustment mechanisms 52A and 52B is shown below. FIG. 20 is a diagram showing a modified example of the squeeze roller adjustment mechanism 52A provided in the magnet separator 100. In FIG. 20, the squeeze roller adjustment mechanism 52A is explained. It should be noted that this explanation can be applied to the squeeze roller adjustment mechanism 52B in a similar manner.

In the example shown in FIG. 20, the squeeze roller adjustment mechanism 52A further comprises a pair of guides 59. The pair of guides 59 prevents the second spring receiver 56 from moving in a direction (for example, the left-right direction) intersecting with the direction in which the adjustment bolt 584 moves. The pair of guides 59 is provided at the both ends of the attachment plate 54 so as to interpose the second spring receiver 56 between them.

For example, the pair of guides 59 is formed integrally with the attachment plate 54. The guides 59 comprise protrusion portions 591 which face each other from the end connected to the attachment plate 54 and the other end on the opposite side, respectively. Each of the guides 59 may further comprise an attachment hole 59a for attaching a cover which is described later. For example, screw processing has been applied to the inner circumferential surface of the attachment hole 59a.

As the motion of the second spring receiver 56 is prevented by the pair of guides 59, the squeeze roller 51 can be easily adjusted by the adjustment bolt 584. Further, as the motion of the second spring receiver 56 is prevented, the contact portion 565 which is provided on the upper side of the second portion 562 and explained with reference to FIG. 15 may not be provided.

Figure 21:
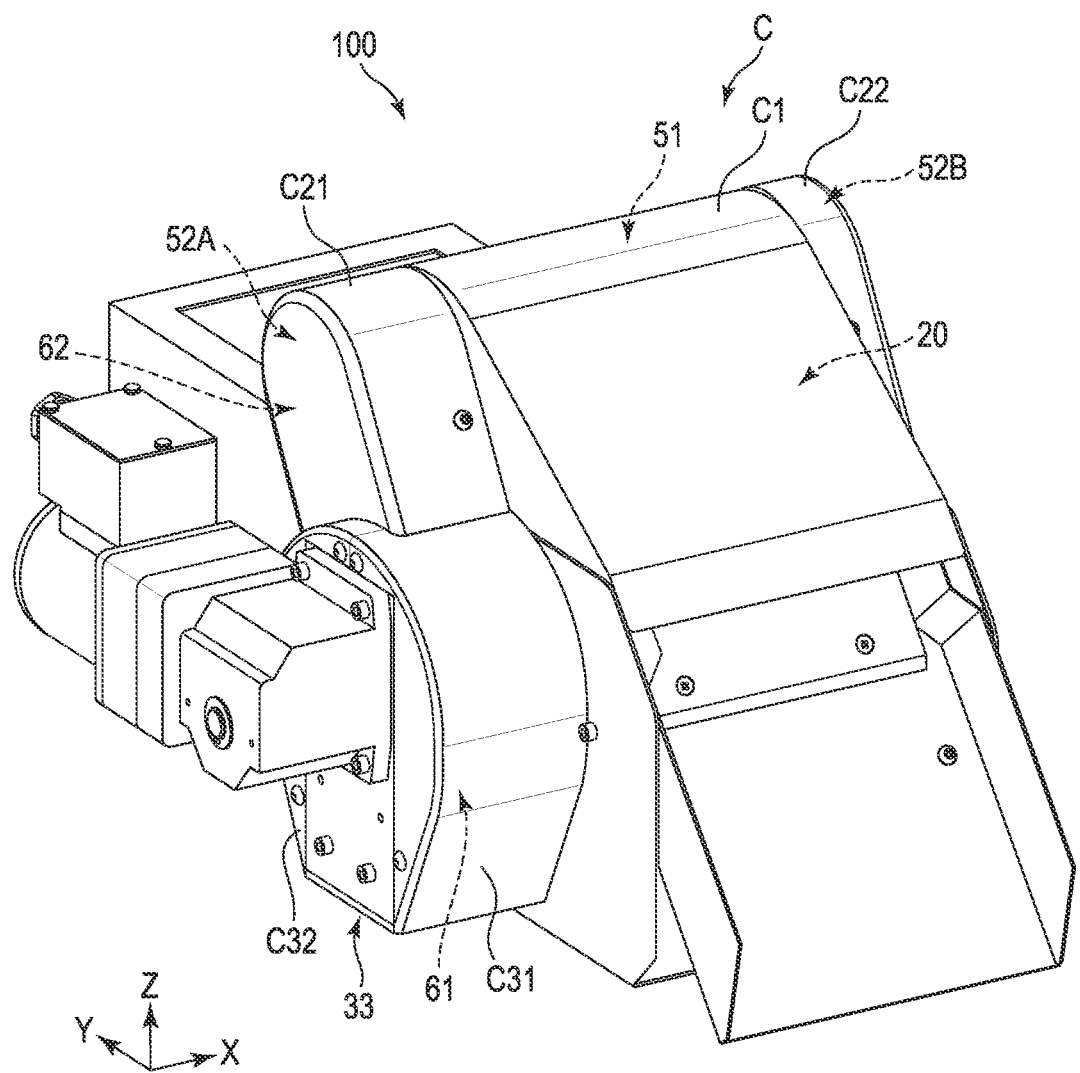
FIG. 21 is a schematic perspective view of a magnet separator in which a cover is provided.

The magnet separator 100 may further comprise a cover. FIG. 21 is a schematic perspective view of the magnet separator 100 in which a cover C is provided. The magnet separator 100 further comprises the cover C which is detachably provided. The cover C mainly covers rotating members such as the magnet drum 20, squeeze roller 51 and transmission mechanism 60 of the magnet separator 100.

The cover C comprises a cover C1 which covers the magnet drum 20 and the squeeze roller 51, covers C21 and C22 which cover the squeeze roller adjustment mechanisms 52A and 52B, and covers C31 and C32 which cover the second shaft 25 and the coupling 34 of the second embodiment. In the transmission mechanism 60, the first rotating body 61 is mainly covered with the covers C31 and C32, and the second rotating body 62 is mainly covered with the cover C21.

For example, the cover C1 is secured to the separator body 10. For example, the covers C21 and C22 are secured to the squeeze roller adjustment mechanisms 52A and 52B. For example, the covers C31 and C32 are secured to the bracket 33. The provision of the cover C can prevent the generation of noise during the operation of the magnet separator 100. Further, as the cover C covers all of the rotating members, the magnet separator 100 is made safer. When the first portion 581 of the adjustment portion 58 is provided on the tension coil spring 57 side relative to the attachment plate 54 as shown in FIG. 20, the covers C21 and C22 can be easily detached.

Each of the magnet adjustment tool 71, squeeze roller adjustment mechanisms 52A and 52B and cover C explained with reference to FIG. 18 to FIG. 21 can be applied to each of the above embodiments.

Each embodiment shows an example in which the length of the separator body 10 in the second direction Y is greater than that in the first direction X. However, the length in the first direction X may be greater than that in the second direction Y, or the length in the first direction X may be equal to that in the second direction Y.

In the above description, the driving portion 30 is provided outside the separator body 10 on the side wall 12a side. However, the driving portion 30 may be provided outside the separator body 10 on the side wall 12b side. In this case, the bracket 33 and the transmission mechanism 60 are provided on the side wall 12b side, and the magnet adjustment tool 71 is provided on the side wall 12a side. The driving portion 30 is merely an example. For example, the speed reducer 32 may be a solid output portion.

The separator body 10 may further comprise a baffle plate. For example, the baffle plate is provided near the central portion of the separator body 10 in the second direction Y from the side wall 12a toward the side wall 12b. As the fluid collides with the baffle plate before the fluid is put into the storage portion 10a, the force of the put fluid can be controlled. In addition, it is possible to prevent the fluid from directly colliding with the cylinder 22 without the storage in the storage portion 10a. Further, foreign substances containing a magnetic material can be effectively attached to the outer circumferential surface 221 of the cylinder 22 by supplying the fluid from the storage portion 10a to the channel 80 at a predetermined current rate.

In the present embodiment, for example, gap G3 is defined with a constant distance along the first shaft 21. However, the distance may not be constant. The distance may be increased or decreased from the central portion of the cylinder 22 toward the end portions 22a and 22b. The number of current plates 15A to 15D may be one or three or more in the end portions 22a and 22b. The widths of the current plates 15A to 15D in the first direction X may be different from each other.

Regarding the second spring receiver 56, instead of a pair of hooking portions 563 and 564, for example, bolts which protrude toward the attachment plate 54 may be provided in the lower end portion of the first portion 561. In this case, a pair of hook portions 572 and 573 is attached to the bolts, etc.

Regarding a pair of squeeze roller adjustment mechanisms 52A and 52B, to recognize the amount of screwing of the adjustment bolt 584, a scale may be provided in the adjustment portion 58, etc. To recognize the amount of screwing of the adjustment bolt 584, for example, a colored mark may be provided in the screw portion of the adjustment bolt 584.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnet separator comprising:
a separator body comprising a storage portion which stores a fluid containing a magnetic material;
a magnet drum provided in the separator body; and
a driving portion provided outside the separator body, wherein
the magnet drum comprises a first shaft extending in a horizontal direction, a cylinder provided inside the separator body, rotatably supported in the first shaft so as to be at least partly immersed in the fluid and comprising an outer circumferential surface and an inner circumferential surface on an opposite side of the outer circumferential surface, an inner cylinder provided in the cylinder and secured to the first shaft, a magnet provided in the inner cylinder so as to face the inner circumferential surface and forming a magnetic field area to which the magnetic material can be attached in a certain range in a circumferential direction of the outer circumferential surface, a second shaft provided on a same line as a central axis of the first shaft and rotating together with the cylinder, and a pair of side plates provided in both end portions of the cylinder and rotatably supported in the first shaft,
the separator body comprises a pair of side walls arranged in the horizontal direction,
the driving portion comprises an output portion provided on the same line as the central axis of the first shaft outside the separator body,
the second shaft is provided in one of the side plates and penetrates one of the side walls toward outside of the separator body, and
the output portion is connected to the second shaft to rotate the cylinder.

2. The magnet separator of claim 1, further comprising a magnet adjustment tool provided outside the separator body and capable of adjusting a position of the magnet relative to the central axis in a circumferential direction.

3. The magnet separator of claim 1, further comprising:
a third shaft;
a squeeze roller which is provided in the third shaft and which squeezes the fluid contained in the magnetic material attached to the outer circumferential surface;
a squeeze roller adjustment mechanism which is provided in the third shaft and adjusts a distance between the first shaft and the third shaft; and
a transmission mechanism which transmits rotation of the second shaft to the third shaft.

4. The magnet separator of claim 1, further comprising a coupling connected to the second shaft outside the separator body, wherein
the driving portion further comprises a fourth shaft connected to the output portion and the coupling.

5. A magnet separator comprising:
a separator body comprising a storage portion which stores a fluid containing a magnetic material;
a magnet drum provided in the separator body;
a driving portion provided outside the separator body;
a bottom plate which forms a channel to which the fluid is supplied from the storage portion; and
a pair of partition plates, wherein
the magnet drum comprises a first shaft extending in a horizontal direction, a cylinder provided inside the separator body, rotatably supported in the first shaft so as to be at least partly immersed in the fluid and comprising an outer circumferential surface and an inner circumferential surface on an opposite side of the outer circumferential surface, a pair of side plates provided in both end portions of the cylinder and rotatably supported in the first shaft, a magnet provided so as to face the inner circumferential surface and forming a magnetic field area to which the magnetic material can be attached in a certain range in a circumferential direction of the outer circumferential surface, and a second shaft provided in one of the side plates on a same line as a central axis of the first shaft, extending toward outside of the separator body and rotating together with the cylinder,
the driving portion is connected to the second shaft outside the separator body to rotate the cylinder,
the bottom plate is provided inside the separator body across an intervening gap along the outer circumferential surface, and
each of the partition plates is provided between the side plate and a side wall of the separator body and extends in the central axis.

6. The magnet separator of claim 5, wherein
a gap defined between the partition plate and the side plate is smaller than a gap defined between the partition plate and the side wall.

7. The magnet separator of claim 5, further comprising a current plate provided between the bottom plate and the outer circumferential surface and including, of the outer circumferential surface, a surface facing an end portion of the cylinder.

8. The magnet separator of claim 5, wherein
the channel comprises an inflow port located on an upstream side, and an outflow port which is located on a downstream side and in which a width in the horizontal direction is greater than the inflow port.

9. A magnet separator comprising:
a separator body comprising a storage portion which stores a fluid containing a magnetic material;
a magnet drum provided in the separator body;
a driving portion provided outside the separator body; and
a bracket, wherein the magnet drum comprises a first shaft extending in a horizontal direction, a cylinder provided inside the separator body, rotatably supported in the first shaft so as to be at least partly immersed in the fluid and comprising an outer circumferential surface and an inner circumferential surface on an opposite side of the outer circumferential surface, an inner cylinder provided in the cylinder and secured to the first shaft, a magnet provided in the inner cylinder so as to face the inner circumferential surface and forming a magnetic field area to which the magnetic material can be attached in a certain range in a circumferential direction of the outer circumferential surface, and a second shaft provided on a same line as a central axis of the first shaft and rotating together with the cylinder, the separator body comprises a pair of side walls arranged in the horizontal direction, the bracket connected to one of the side walls, the driving portion comprises an output portion provided on the same line as the central axis of the first shaft outside the separator body, the second shaft penetrates one of the side walls and the bracket toward outside of the separator body, the driving portion is connected to one of the side walls via the bracket, and the output portion is connected to the second shaft to rotate the cylinder.

* * * * *